(12) United States Patent
Ge et al.

(10) Patent No.: US 11,540,244 B2
(45) Date of Patent: Dec. 27, 2022

(54) MEC INFORMATION OBTAINING METHOD AND APPARATUS

(71) Applicant: HUAWEI TECHNOLOGIES CO., LTD., Guangdong (CN)

(72) Inventors: Cuili Ge, Beijing (CN); Yanmei Yang, Beijing (CN); Jingwang Ma, Shanghai (CN); Zheng Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 17/148,045

(22) Filed: Jan. 13, 2021

(65) Prior Publication Data

US 2021/0136716 A1 May 6, 2021

Related U.S. Application Data

(63) Continuation of application No. PCT/CN2019/096154, filed on Jul. 16, 2019.

(30) Foreign Application Priority Data

Jul. 16, 2018 (CN) .......................... 201810780270.7

(51) Int. Cl.
*H04W 4/00* (2018.01)
*H04W 60/00* (2009.01)

(52) U.S. Cl.
CPC .................................. *H04W 60/00* (2013.01)

(58) Field of Classification Search
CPC ......... H04W 4/00; H04W 4/02; H04W 4/021; H04W 4/022; H04W 8/005; H04W 16/00; H04W 48/02; H04W 48/06; H04W 48/16; H04W 48/17; H04W 48/18; H04W 48/20; H04W 60/00; H04W 60/005; H04W 64/003; H04W 64/00
USPC ....................................................... 455/435.1
See application file for complete search history.

(56) References Cited

U.S. PATENT DOCUMENTS

| | | | |
|---|---|---|---|
| 2019/0020657 A1* | 1/2019 | Egner | ................ G06Q 20/3674 |
| 2019/0208007 A1* | 7/2019 | Khalid | ................ H04L 67/1021 |
| 2019/0253995 A1 | 8/2019 | Xiong et al. | |

FOREIGN PATENT DOCUMENTS

| | | |
|---|---|---|
| CN | 105245595 A | 1/2016 |
| CN | 107018534 A | 8/2017 |
| CN | 107770815 A | 3/2018 |
| CN | 108076488 A | 5/2018 |
| CN | 108282801 A | 7/2018 |
| CN | 109600721 A | 4/2019 |

(Continued)

OTHER PUBLICATIONS

Extended European Search Report issued in European Application No. 19838743.3 dated Aug. 4, 2021, 10 pages.

(Continued)

*Primary Examiner* — Huy C Ho

(74) *Attorney, Agent, or Firm* — Fish & Richardson P.C.

(57) ABSTRACT

The present disclosure relates to mobile edge computing (MEC) information obtaining methods and apparatus. One example method performed by a first network element includes receiving target reference information from a second network element, and sending, to the second network element, information about a MEC platform corresponding to the target reference information. The target reference information comprises target capability information.

20 Claims, 18 Drawing Sheets

(56) References Cited

FOREIGN PATENT DOCUMENTS

| EP | 2367356 A1 | 9/2011 |
|---|---|---|
| WO | 2017091934 A1 | 6/2017 |
| WO | 2018095510 A1 | 5/2018 |

OTHER PUBLICATIONS

3GPP TR 23.722 V0.2.0 (May 2017), "3rd Generation Partnership Project;Technical Specification Group Services and System Aspects;Study on Common API Framework for 3GPP Northbound APIs(Release 15)," May 2017, 97 pages.

3GPP TS 23.222 V16.0.0 (Jun. 2018), "3rd Generation Partnership Project;Technical Specification Group Services and System Aspects;Functional architecture and information flows to support Common API Framework for 3GPP Northbound APIs;Stage 2(Release 16)," Jun. 2018, 89 pages.

3GPP TS 23.502 V15.2 0 (Jun. 2018), "3rd Generation Partnership Project;Technical Specification Group Services and System Aspects;Procedures for the 5G System;Stage 2(Release 15)," Jun. 2018, 308 pages.

Ericsson LM et al., "Multi-server MBMS bearer coordination," 3GPP TSG-SA6 Meeting #19, S6-171601, Dubrovnik, Croatia, Oct. 9-13, 2017, 7 pages.

ETSI GS MEC 012 V1.1.1, "Mobile Edge Computing (MEC); Radio Network Information API," Jul. 2017, 57 pages.

Huawei et al., "Supporting MEC with CAPIF," 3GPP TSG-SA WG6 Meeting #25, S6-181079, Sophia Antipolis, France, Jul. 23-27, 2018, 4 pages.

Office Action issued in Chinese Application No. 201810780270.7 dated Jun. 3, 2020, 17 pages (with English translation).

PCT International Search Report and Written Opinion issued in International Application No. PCT/CN2019/096154 dated Sep. 26, 2019, 15 pages (with English translation).

Samsung, "Revised SID on Common API Framework," 3GPP TSG|WG6 Meeting #16, S6-170397, Dali, P.R. China, Apr. 3-7, 2017, 3 pages.

Yanli et al., "MEC Coordinated Future 5G Mobile Wireless Networks," Journal of Computer Research and Development, vol. 55, No. 3, Mar. 2018, 9 pages (with English abstract).

\* cited by examiner

MEC INFORMATION OBTAINING METHOD AND APPARATUS

CROSS-REFERENCE TO RELATED APPLICATIONS

This application is a continuation of International Application No. PCT/CN2019/096154, filed on Jul. 16, 2019, which claims priority to Chinese Patent Application No. 201810780270.7, filed on Jul. 16, 2018. The disclosures of the aforementioned applications are hereby incorporated by reference in their entireties.

TECHNICAL FIELD

This application relates to the field of communications technologies, and in particular, to a mobile edge computing (MEC) information obtaining method and apparatus.

BACKGROUND

A MEC effectively integrates a wireless network with an Internet technology, adds functions such as computing, storage, and processing to a wireless network side, constructs an open platform to implant an application, implements information exchange between the wireless network and a service server through a radio application programming interface (API), and integrates the wireless network with a service. Oriented to services (the Internet of Things, videos, healthcare, retail, and the like), the MEC may provide customized and differentiated services to the industry, to improve network utilization efficiency and a value-added value.

Usually, the MEC is deployed on a radio access network (RAN), or is deployed at a location relatively close to a RAN, to reduce a data transmission delay. Therefore, a service scope that can be provided by a MEC and a user that can be served by the MEC are limited by a service scope of an access network and a user that can be served by the access network. Consequently, a requirement of a third-party application cannot be satisfied.

SUMMARY

This application provides a MEC information obtaining method and apparatus, to implement a MEC discovery process.

According to a first aspect, this application provides a MEC information obtaining method, and the method includes:

receiving, by a first network element, target reference information from a second network element; and sending, by the first network element, to the second network element, information about a MEC corresponding to the target reference information.

According to the foregoing method, a MEC discovery process is implemented, so that the second network element can communicate with the MEC based on the obtained information about the MEC, to use a capability of the MEC to implement a service requirement that cannot be satisfied by the second network element. Further, the MEC and the second network element may belong to different domains, for example, belong to different operators, so that a solution of invoking the MEC across operators is implemented, and a requirement that a third-party application can provide a service for users of different operators is satisfied.

In a possible implementation, the target reference information includes at least one of target location information and target capability information.

In a possible implementation, before the sending, by the first network element, to the second network element, information about a MEC, the method further includes: receiving, by the first network element, first registration information of the MEC, where the first registration information includes addressing information of the MEC, and the first registration information further includes attribute description information of the MEC.

In a possible implementation, the attribute description information includes one or more of the following information: application programming interface API information provided by the MEC, location information of the MEC, service area information of the MEC, capability description information of the MEC, and a domain identifier of the MEC.

In a possible implementation, the first network element is a common API framework core function CCF, and the second network element is a mobile edge computing MEC; or the first network element is a CCF, the second network element is a CCF, and a domain to which the first network element belongs is different from a domain to which the second network element belongs; or
the first network element is a MEC proxy function entity, and the second network element is a MEC; or
the first network element is a MEC proxy function entity, the second network element is a MEC proxy function entity, and a domain to which the first network element belongs is different from a domain to which the second network element belongs; or
the first network element is a network exposure function network element NEF, and the second network element is a MEC; or
the first network element is a NEF, the second network element is a NEF, and a domain to which the first network element belongs is different from a domain to which the second network element belongs.

In a possible implementation, when a domain to which the MEC belongs is the same as a domain to which the first network element belongs, after the first network element receives the first registration information, the method further includes: sending, by the first network element, second registration information of the MEC to a third network element, where the second registration information is used to register the information about the MEC with the third network element, a domain to which the third network element belongs is different from the domain to which the first network element belongs, the second registration information includes the addressing information of the MEC and some or all of the attribute description information of the MEC.

In a possible implementation, when the attribute description information of the MEC includes the location information of the MEC, the method further includes: when the first network element determines that the location information of the MEC is location information in the domain to which the first network element belongs, converting, by the first network element, the location information of the MEC into general location information, and sending the general location information to the third network element; and/or when the attribute description information of the MEC includes the service area information of the MEC, the method further includes: when the first network element determines that the service area information of the MEC is location information in the domain to which the first network element belongs, converting, by the first network element, the service area information of the MEC into general service area information, and sending the general service area information to the third network element.

In a possible implementation, the first network element is a CCF, the third network element is a CCF, and the domain to which the first network element belongs is different from the domain to which the third network element belongs.

In a possible implementation, the information about the MEC includes information about a CCF corresponding to the MEC.

In a possible implementation, the information about the MEC includes the addressing information of the MEC and the attribute description information of the MEC.

According to a second aspect, an embodiment of this application provides a mobile edge computing MEC information obtaining method, including:

sending, by a second network element, target reference information to a first network element; and receiving, by the second network element, from the first network element, information about a MEC corresponding to the target reference information.

In a possible implementation, the target reference information includes at least one of target location information and target capability information.

In a possible implementation, the information about the MEC includes information about a CCF corresponding to the MEC.

In a possible implementation, the information about the MEC includes the addressing information of the MEC and the attribute description information of the MEC.

In a possible implementation, the attribute description information of the MEC includes one or more of the following information: service area information of the MEC, capability description information of the MEC, application programming interface API information provided by the MEC, location information of the MEC, and a domain identifier of the MEC.

In a possible implementation, the first network element is a common API framework core function CCF, and the second network element is a mobile edge computing MEC; or the first network element is a CCF, the second network element is a CCF, and a domain to which the first network element belongs is different from a domain to which the second network element belongs; or the first network element is a MEC proxy function entity, and the second network element is a MEC: or the first network element is a MEC proxy function entity, the second network element is a MEC proxy function entity, and a domain to which the first network element belongs is different from a domain to which the second network element belongs; or the first network element is a network exposure function network element NEF, and the second network element is a MEC; or the first network element is a NEF, the second network element is a NEF, and a domain to which the first network element belongs is different from a domain to which the second network element belongs.

In a possible implementation, the second network element is a MEC; and when the attribute description information of the MEC includes the API information provided by the MEC, the method further includes: sending, by the second network element, based on the API information, an API invocation request to the MEC corresponding to the target reference information; and receiving, by the second network element, an API invocation response sent by the MEC corresponding to the target reference information.

In a possible implementation, the second network element is a MEC; and when the attribute description information of the MEC does not include the API information provided by the MEC, the method further includes: sending, by the second network element, an API discovery request to the MEC or the CCF corresponding to the MEC; and receiving, by the second network element, an API discovery response, where the API discovery response includes the API information provided by the MEC.

In a possible implementation, the method further includes: sending, by the second network element, registration information of the MEC to the first network element, where the registration information of the MEC includes the addressing information of the MEC and the attribute description information of the MEC.

According to a third aspect, an embodiment of this application provides a MEC information obtaining method, including:

receiving, by a first network element, first registration information from a MEC, where the first registration information includes addressing information of the MEC and attribute description information of the MEC; and sending, by the first network element, second registration information to a second network element based on the first registration information, where a domain to which the first network element belongs is different from a domain to which the second network element belongs.

In a possible implementation, the attribute description information of the MEC includes one or more of the following information: service area information of the MEC, capability description information of the MEC, application programming interface API information provided by the MEC, location information of the MEC, and a domain identifier of the MEC.

In a possible implementation, when the attribute description information of the MEC includes the location information of the MEC, the method further includes: when the first network element determines that the location information of the MEC is location information in the domain to which the first network element belongs, converting, by the first network element, the location information of the MEC into general location information, and sending the general location information to the third network element: and/or when the attribute description information of the MEC includes the service area information of the MEC, the method further includes: when the first network element determines that the service area information of the MEC is location information in the domain to which the first network element belongs, converting, by the first network element, the service area information of the MEC into general service area information, and sending the general service area information to the third network element.

According to a fourth aspect, an embodiment of this application provides a MEC information obtaining apparatus. The apparatus includes a receiving unit and a sending unit, and may further include a processing unit. The receiving unit, the sending unit, and the processing unit are configured to perform the method according to any one of the first aspect or the implementations of the first aspect.

According to a fifth aspect, an embodiment of this application provides a MEC information obtaining apparatus. The apparatus includes a sending unit and a receiving unit, and may further include a processing unit. The receiving unit, the sending unit, and the processing unit are configured to perform the method according to any one of the second aspect or the implementations of the second aspect.

According to a sixth aspect, an embodiment of this application provides a MEC information obtaining apparatus. The apparatus includes a receiving unit and a sending unit, and may further include a processing unit. The receiving unit, the sending unit, and the processing unit are configured to perform the method according to any one of the third aspect or the implementations of the third aspect.

According to a seventh aspect, an embodiment of this application provides a storage medium, where the storage medium stores a computer program, and the computer program is executed by a processor, to implement the method according to any one of the first aspect to the third aspect or the possible implementations of the first aspect to the third aspect.

DESCRIPTION OF EMBODIMENTS

To make the objectives, technical solutions, and advantages of this application clearer, the following further describes this application in detail with reference to the accompanying drawings.

A MEC is deployed on a RAN or deployed at a location relatively near a RAN, so that a data transmission delay can be reduced, and a response speed can be improved. However, because the deployment of the MEC is related to the RAN, a service area and a served user of the MEC are also limited. For example, if a MEC is deployed on a base station in an area A, the MEC may provide, in the area A, a service for a third-party application, but a service scope of the MEC may be incapable of covering an area B, and a requirement that the third-party application provides a service for a user in the area B cannot be satisfied. For another example, if a MEC is deployed on a base station of an operator A, the MEC may be incapable of providing a service for a user of a local operator B.

Because a service scope that can be provided by one MEC and a user that can be served by the MEC are limited, one MEC may be incapable of satisfying a service requirement of a third-party application, and coordination between a plurality of MECs may be needed. However, in a conventional technical solution, there is no method for obtaining information about another MEC. Therefore, a service requirement of a third-party application cannot be satisfied through coordination between a plurality of MECs.

To resolve the foregoing technical problem, an embodiment of this application provides a MEC information obtaining method.

Figure 1A:
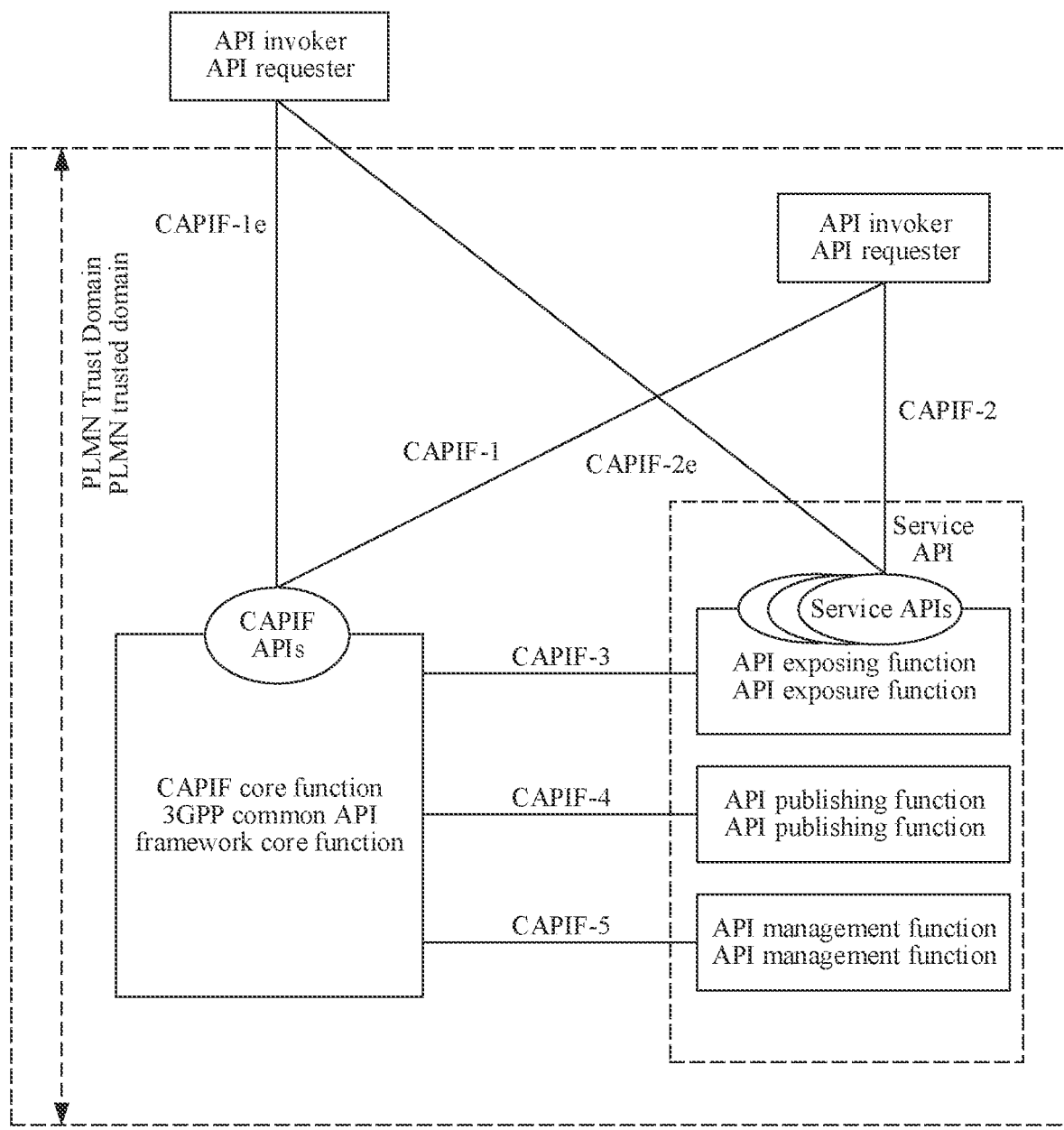
FIG. 1(a) and FIG. 1(b) show a network architecture to which an embodiment of this application is applicable according to this application.
Figure 1B:
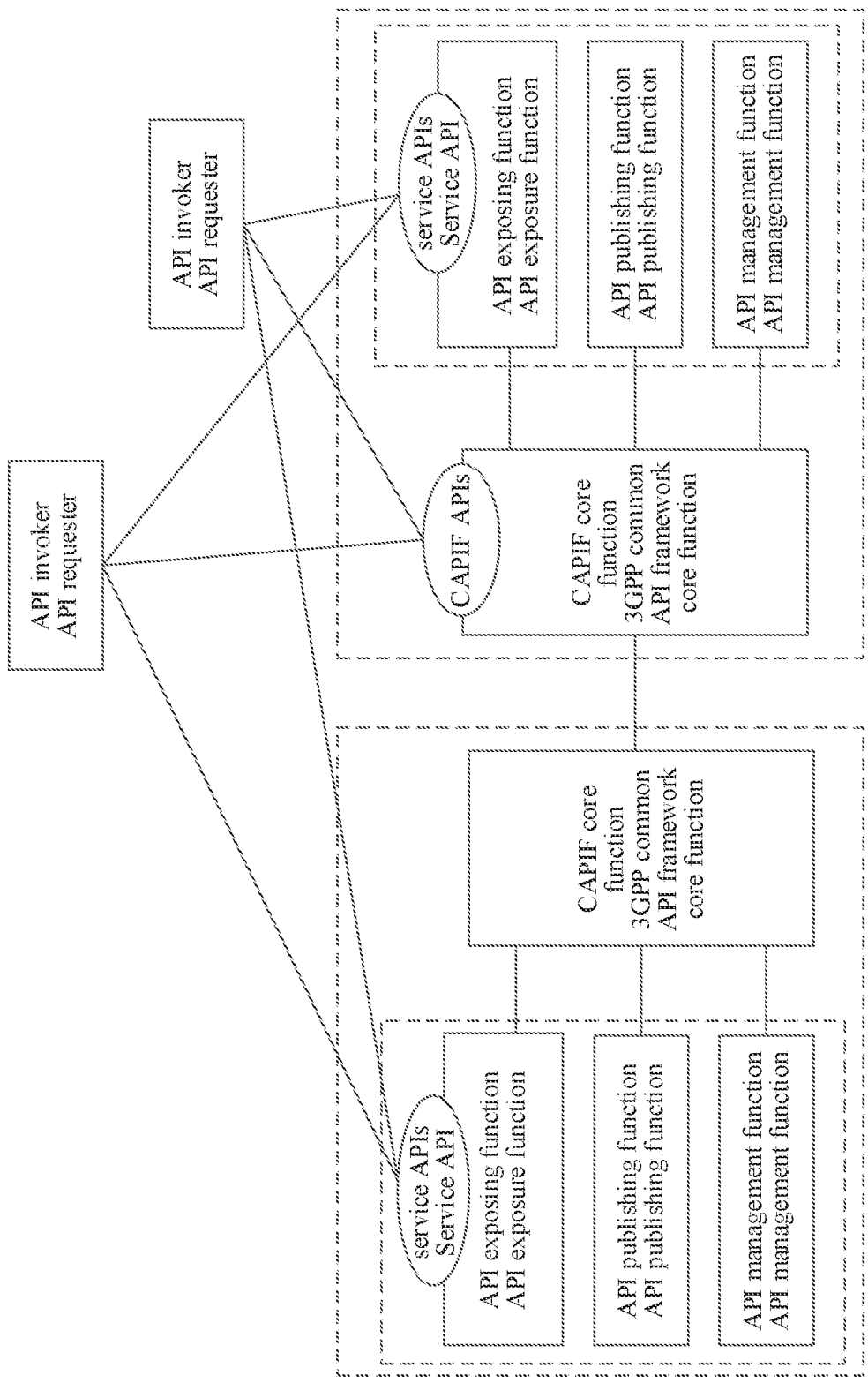

FIG. 1(a) and FIG. 1(b) are a schematic diagram of a network architecture to which a MEC information obtaining method according to an embodiment of this application is applicable. In a scenario shown in FIG. 1(a), a 3GPP common API framework core function (CAPIF core function, CCF) may be deployed in a network domain of a public land mobile network (PLMN). An operator of the PLMN also serves as an API provider (service provider), and registers an API with the CCF. An API provider of a third party may share an API of the API provider, and publish the API to another API provider. In a scenario shown in FIG. 1(b), a CCF may be deployed in each of two API providers. In other words, a CCF logical unit is deployed in a MEC. One API provider may publish information about an API provision capability of the API provider to the other API provider by using the CCF, to implement API sharing.

Function entities are described as follows:

(1) An API invoking entity (API invoker) is also referred to as an API invoker, and is generally a third-party application that signs a service protocol with a PLMN operator, for example, a machine to machine (M2M) application, an internet of things (IoT) application, or a vehicle to everything (V2X) application. These applications may be run in a terminal device, or may be run in a network device. The API invoking entity may be a device in a PLMN network, for example, a mobility management entity (MME), a RAN, or a policy and charging control function (PCRF) in a 4G communications system, or may be an access and mobility management function (AMF), a session management function (SMF), a user plane function (UPF), a policy control function (PCF), an application function (AF), or the like in a 5G communications system. The API invoking entity and the PLMN operator are located in a same trusted domain. The API invoking entity supports the following capabilities: authenticating the API invoking entity by authenticating an identifier and other information of the API invoking entity: mutual authentication between the API invoking entity and a CAPIF; obtaining authorization before accessing an API; discovering an API; invoking an API; and the like.

(2) The CCF has the following functions: authenticating the API invoking entity based on the identifier and other information of the API invoking entity; mutual authentication between the CCF and the API invoking entity: providing authorization to the API invoking entity before the API invoking entity accesses an API; publishing, storing, and supporting API discovery; responsible for access control of an API based on a policy of the PLMN operator; storing API invocation logs and providing the logs to an authorized entity: detecting API invocation; registering the API invoking entity; storing a configuration policy: and the like.

3) An API exposure function (AEF) is an entry for the API invoking entity to invoke an API, and has the following functions: authenticating the API invoking entity based on the identifier of the API invoking entity and other information provided by the CCF; confirming the authorization provided by the CCF: and synchronizing the API logs to the CCF.

4) An API publishing function provides a function of publishing an API, so that the API invoking entity can discover the API.

5) An API management function provides management of an API, and specifically includes the following functions: auditing the API invocation logs provided by the CCF; monitoring an event reported by the CCF: configuring, for the API, a policy of an API provider; detecting a status of the API: and registering the API invoking entity.

In the network architecture shown in FIG. 1(*a*) and FIG. 1(*b*), the CCF and the function entities (the API exposure function, the API publishing function, and the API management function) in an API provider domain may be considered as a MEC, or the CCF, the API exposure function, and the API publishing function may be considered as a MEC, or the CCF and the AEF may be considered as a MEC, or the AEF may be considered as a MEC.

Figure 2:
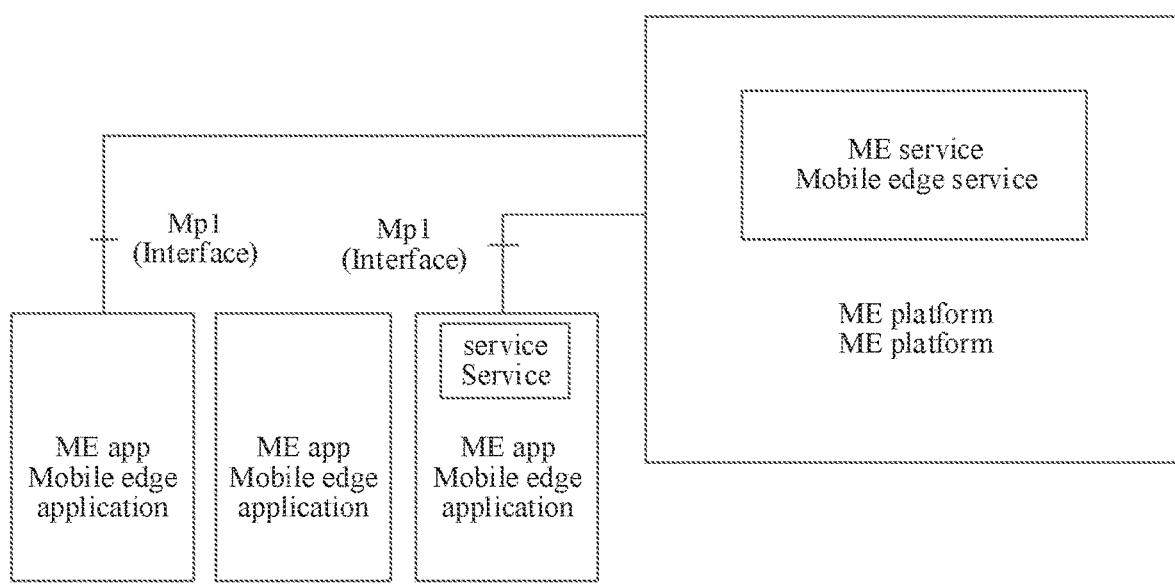
FIG. 2 is a schematic diagram of a MEC architecture according to this application.

FIG. 2 is another schematic diagram of a network architecture to which a MEC information obtaining method according to an embodiment of this application is applicable.

A network exposure function network element (NEF) may expose a network capability, provided by a mobile communications network, to an internal network element (such as an SMF or an AMF) of the mobile communications network, or an external third-party application, such as a V2X application or an IoT application.

A network function repository network element (NF repository function, NRF) is configured to: maintain network element information (including a network element type, a network element identifier, a slice in which a network element is located, a service provided by a network element, and the like) of the mobile communications network, and further support a service discovery function, to be specific, provide, to a requester that requests to discover a network element or a service, information about the network element or the service that satisfies a service requirement of the requester.

A function of another network element is not described in detail herein. For details, refer to a related communications standard protocol.

Figure 3:
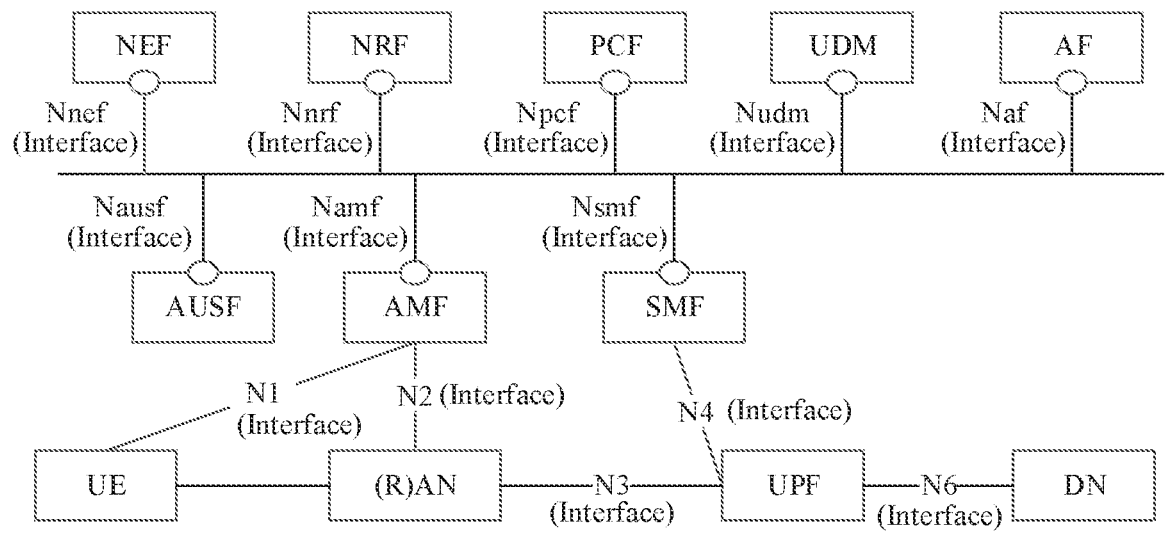
FIG. 3 shows another network architecture to which an embodiment of this application is applicable according to this application.

FIG. 3 is a schematic diagram of a MEC architecture according to an embodiment of this application. As shown in the figure, the MEC architecture may include: a mobile edge platform, a mobile edge application, and a mobile edge service.

The mobile edge platform is a set of functions required to run various mobile edge applications on a virtual infrastructure of a particular mobile edge host. The mobile edge platform may provide and consume various mobile edge services and may provide a plurality of types of mobile edge services to the mobile edge platform. For example, functions such as service registration, service discovery, transmission rule control, and DNS parsing are supported.

The mobile edge application (ME app) is an application that can be instantiated on a mobile edge host in a mobile edge system. The mobile edge application has potential to potentially provide or consume a mobile edge service.

The mobile edge service (ME service) is a service provided by using the mobile edge platform or a mobile edge application, and may be usually provided for the mobile edge application through an API.

In addition, in this embodiment of this application, registering information about a network element A with a network element B may also be understood as publishing the information about the network element A to the network element B. Further, the network element B stores the information about the network element A.

In the schematic diagram shown in FIG. 3, N1, N2, N4, Nnef, and the like represent interfaces, and other related network elements are respectively: user equipment (UE), an access network (AN), a user plane function (UPF) entity, a data network (DN), an authentication server function (AUSF), an access and mobility management function (AMF) entity, a session function management (SMF) entity, a network exposure (Network Exposure Function, NEF) entity, a network repository function (NRF) entity, a policy control function (PCF) entity, unified data management (UDM), and an application function (AF).

With reference to the accompanying drawings, the following describes in detail a MEC information obtaining method provided in the embodiments of this application.

Figure 4:
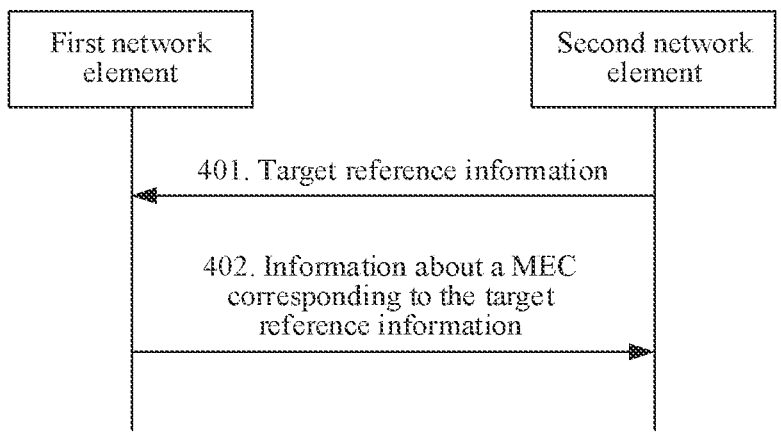
FIG. 4 is a schematic flowchart of a MEC information obtaining method according to this application.

Referring to FIG. 4, the method may include the following steps.

Step 401: A first network element receives target reference information from a second network element.

The target reference information may be used by the first network element to search for information about a MEC corresponding to the target reference information. The target reference information may include at least one of target location information and target capability information.

In a possible implementation, the target reference information may be carried in a message sent by the second network element to the first network element. For example, the message may be a MEC discovery request, a service discovery request, or an API discovery request message. An example in which the target reference information is carried in the MEC discovery request is used for description below.

The second network element may send a MEC discovery request, and the request carries the target reference information, so that the first network element can send the information about the MEC corresponding to the target reference information to the second network element. Specifically, the target reference information may include the target location information and/or the target capability information. For example, a third-party application is deployed on a MEC 1, a service area corresponding to the MEC 1 is an area A, and the MEC 1 can provide, in the area A, a service for the third-party application (for example, broadcast a V2X message to a vehicle, in the area A, that supports V2X). However, some users of the third-party application are located in an area B. To satisfy a requirement of the third-party application for implementing service coverage in the area B, the MEC 1 may send a MEC discovery request. The request includes target location information, namely, indication information of the area B, to indicate that the MEC 1 requests to obtain information about one or more MECs that can provide a service for the area B. For another example, the MEC 1 can provide a service of a V2X type, and a third-party application needs to provide a service of a V2X type, and further needs to provide a broadcast service. In this case, the MEC 1 may send a MEC discovery request, and the request includes target capability information, namely, indication information of the broadcast service, to indicate that the MEC 1 requests to obtain information about a MEC that can provide the broadcast service. For still another example, if a third-party application is deployed on a MEC 1 in a China Mobile network, the MEC 1 corresponds to a service area A, the third-party application further needs to provide a service for a user of China Unicom in the area A, and the MEC 1 may send a MEC discovery request. The request includes target location information, namely, indication information of the area A, and domain identifier information of China Unicom, to indicate that the MEC 1 requests to obtain information about a MEC that can provide the service for the user of China Unicorn in the area A. The indication information of the area A may be an identifier of the area A, or may be latitude and longitude information of the area A. or may be other information that can correspond to the area A. Certainly, the MEC discovery request further includes both the target location information and target capability information. For example, the MEC 1 needs to obtain information about a MEC that can provide a broadcast service for the area A. In this case, target reference information sent by the MEC 1 may include the indication information of the area A and indication information of the broadcast service.

It should be understood that the target location information indicates that the second network element needs to obtain the information about the MEC that can provide the service for the target location, but does not indicate that the MEC that the second network element requests to obtain should be deployed at the target location. For example, the MEC 1 is deployed in the area A, but service areas of the MEC include the area A, an area B, and an area C. When a MEC 2 requests to obtain a MEC that can provide a service for the target area B, the MEC 1 still satisfies a requirement of the MEC 2, because the MEC 1 can provide the service for the area B although the MEC 1 is not located in the area B.

Step 402: The first network element sends, to the second network element, information about a MEC corresponding to the target reference information.

When the target reference information is target location information, the MEC corresponding to the target reference information may be a MEC in a target area corresponding to the target location information. Alternatively, when the target reference information is target capability information, the MEC corresponding to the target reference information may be a MEC that has a target capability corresponding to the target capability information. Alternatively, when the target reference information is target location information and target capability information, the MEC corresponding to the target reference information may be a MEC that is in a target area corresponding to the target location information and that has a target capability corresponding to the target capability information. This is not limited.

In the foregoing step, the first network element may determine, based on the target reference information and MEC information obtained by the first network element, the MEC corresponding to the target reference information, and send information about the determined MEC to the second network element.

Specifically, information, about one or more MECs, that is obtained in the first network element may be stored in the first network element through pre-configuration when the first network element is enabled, or may be manually entered into the first network element, or may be MEC information that is obtained by another network element and then sent by the another network element to the first network element.

In a possible implementation, when a new MEC is deployed, or when API information provided by a MEC is changed, or wen another trigger event occurs, the MEC may actively send information about the MEC to the first network element, to register the information about the MEC with the first network element (that is, the first network element obtains the information about the MEC). Certainly, in a network deployed in a hierarchical manner, the MEC may send registration information of the MEC to another network element, and then the another network element sends the registration information to the first network element, to complete the registration of the information about the MEC with the first network element. For example, in a network architecture in which CCFs are deployed in a hierarchical manner, a MEC 1 may send registration information of the MEC 1 to a CCF 1 (whose location is lower in a deployment hierarchy) located on the MEC 1, and then the CCF 1 sends the registration information of the MEC 1 to a CCF 2 whose location is higher in the deployment hierarchy in the network, to register information about the MEC 1 with the CCF 2.

For example, a MEC may send a MEC registration request to the first network element, and the registration request includes addressing information of the MEC and attribute description information of the MEC.

The addressing information of the MEC may be an identifier of the MEC, an identifier of a CCF deployed on the MEC, or the like.

The attribute description information of the MEC may include one or more of the following information:

API information provided by the MEC: The MEC may provide a "service" for a third-party application. The "service" may be understood as a network resource or a program, such as a function, a function library, or a packet, for implementing a particular function. The third-party application may invoke an API to implement the corresponding service. The API information may include an identifier of the API, whether the API can be shared, a type of the API, service area information of the API, and the like.

Domain identifier of the MEC: Indicating a domain to which the MEC belongs. An example in which the addressing information of the MEC is an identifier of the MEC is used. In some scenarios, an identifier of a MEC may uniquely identify one MEC. In some other scenarios, an identifier of a MEC can uniquely identify, in a domain to which the MEC belongs, one MEC. Uniquely identifying one MEC globally is implemented by using "an identifier of the MEC+a domain identifier". The domain to which the MEC belongs may be a CAPIF provider domain or a CAPIF system domain. For example, the MEC may be a set of a CCF, an AEF, an APF, and an AMF in a CAPIF architecture, and the provider domain or the system domain of the CAPIF may be used as the domain to which the MEC belongs. Alternatively, the domain to which the MEC belongs may be a PLMN trusted domain or a PLMN network domain. For example, the MEC is usually deployed in a PLMN, and in this case, the trusted domain or the network domain of the PLMN may be used as the domain to which the MEC belongs. Alternatively, the domain to which the MEC belongs may be an API service provision domain, or the like. Correspondingly, the domain identifier may be a CAPIF ID, a PLMN ID, or an ID of an API provider, or may be a PLMN network domain name (for example, @cmcc.com), an API service provision domain name, or the like.

Location information of the MEC: Usually, a MEC located in the area A can provide a service for a user in the area A. Therefore, the location information of the MEC may also reflect service area information of the MEC to some extent. Specifically, the location information of the MEC may be general location information of the MEC, namely, information that can be identified by all network elements in different domains, for example, a longitude and a latitude of the MEC, an administrative region in which the MEC is located, a service area of a roadside unit (RSU), and an identifier of the RSU (where the RSU may be provided by a third party, and a location area in which the RSU is located may be determined by using the identifier of the RSU). Alternatively, the location information of the MEC may be location information in the domain to which the MEC belongs, for example, an identifier of a cell in which the MEC is located.

Service area information of the MEC: Indicating a service area of the MEC. Similarly, the service area information of the MEC may be general area information, such as a longitude and latitude range and an administrative region of the service area; or may be area information in the domain to which the MEC belongs, for example, a cell, a tracking area, or a registration area that the MEC provides a service for, and the service area of the MEC may be represented by using a cell identifier list, a tracking area identifier list, a registration area identifier list, or the like.

Capability description information of the MEC: Indicating a service type provided by the MEC. For example, APIs provided in the MEC 1 include: an API_1 that provides a broadcast service and an API_2 that provides a traffic charging service. In this case, the capability description information of the MEC may include capability description information such as the broadcast service and the traffic charging service. Specifically, the capability description information may be a text label, for example, a broadcast service/Broadcast or charging/Charging; or may be a predefined enumerated value. For example, 001 indicates a broadcast service/Broadcast, and 002 indicates charging/Charging (where when an information receiver is a network element outside the domain in which the MEC is located, a complete mapping between an enumerated value and capability description further needs to be provided), to facilitate invocation by another network element.

After receiving the registration information of the MEC, the first network element may store the information about the MEC, to search, after subsequently receiving a MEC discovery request, the stored information about the MEC for the information about the MEC corresponding to the target reference information.

Further, after receiving the registration information of the MEC, the first network element may further send the registration information of the MEC to another network element, to register the information about the MEC with the another network element, thereby improving a response speed of the another network element after the another network element receives the MEC discovery request. For example, the MEC 1 that belongs to a PLMN_1 sends first registration information to the CCF 1 (the first network element) in the PLMN_1, where the first registration information includes addressing information of the MEC 1 and the attribute description information of the MEC, to register the information about the MEC 1 with the CCF 1. The CCF 1 sends second registration information to the CCF 2 in a PLMN_2. The second registration information includes the addressing information of the MEC 1 and the attribute description information of the MEC. The attribute description information included in the second registration information may be fewer than the attribute description information included in the first registration information. For example, the attribute description information in the first registration information includes detailed information about an API provided by the MEC 1, capability description information of the MEC 1, location information of the MEC 1, service area information of the MEC 1, and a domain identifier of the MEC 1, and the attribute description information in the second registration information may include only the capability description information of the MEC 1 and the service area information of the MEC 1.

In addition, if the MEC 1 sends the location information (and/or the service area information) of the MEC 1 to the CCF 1, the location information of the MEC 1 may be general location information, or location information in the PLMN_1. However, if the location information of the MEC 1 is the location information (such as a cell identifier) in the PLMN_1, the location information in the PLMN_1 may not be recognized by the CCF 2 that belongs to the PLMN_2. Therefore, before sending the second registration information of the MEC to the CCF 2, the CCF 1 may first determine whether the location information (and/or the service area information) of the MEC 1 is the location information in the PLMN_1. If yes, the CCF 1 may convert the location information into the general location information, for example, an administrative region, and then adds the general location information, obtained through the conversion, to the second registration information and sends the second registration information to the CCF 2.

In another possible implementation, if the first network element does not store information about a MEC, or information about all MECs stored in the first network element does not correspond to the target reference information, the first network element may further send the target reference information to another network element, to obtain, from the another network element, information about a MEC corresponding to the target reference information.

For example, the first network element does not pre-store information about a MEC, and information about all MECs is registered in a network function repository function (NF repository function, NRF). In this case, after receiving a MEC discovery request that carries target reference information, the first network element may send, to the NRF, the MEC discovery request that carries the target reference information, obtain, from the NRF, information about a MEC corresponding to the target reference information.

For another example, the MEC 1 (the second network element) that is located in the area A and belongs to the PLMN_1 sends a MEC discovery request to the CCF 1 (the first network element) in the PLMN_1, to request to obtain a MEC that belongs to the PLMN_2 and can provide a service for a user in the area A. However, the first network element stores only information about a MEC in the PLMN_1, that is, the CCF 1 does not store information about a MEC corresponding to target reference information. The CCF 1 may send a MEC discovery request to the CCF 2 in the PLMN_2 based on a commercial subscription relationship and preset policy information, to obtain, from the CCF 2, information about a MEC corresponding to the target reference information, and send, to the MEC 1, information about a MEC obtained from the CCF 2.

In some embodiments, the information about the MEC that is sent by the first network element in step 402 may include the addressing information of the MEC (for example, the identifier of the MEC) and the attribute description information of the MEC. Specifically, the attribute description information of the MEC that is sent by the first network element may be some or all of the attribute description information of the MEC that is stored by the first network element or obtained by the first network element. For example, the attribute description information stored by the first network element or obtained by the first network element from another network element includes the detailed information about the API provided by the MEC, the capability description information of the MEC 1, the location information of the MEC 1, the service area information of the MEC 1, and the domain identifier of the MEC 1, and the attribute description information sent by the first network element to the second network element may include only the capability description information of the MEC 1 and the service area information of the MEC 1.

In some other embodiments, the information about the MEC that is sent by the first network element in step 402 may alternatively be information about a CCF corresponding to the MEC. For example, in a scenario shown in FIG. 5(a), a logical unit having a CCF_1 function is disposed in the MEC_1. In a MEC_1 registration process, the CCF_1 obtains an identifier of the MEC_1 and attribute description information of the MEC_1 from the MEC_1, and then the CCF_1 sends registration information of the MEC_1 to a CCF_2 (a CCF with a highest level in the PLMN_1). The registration information includes information about the MEC_1 and/or information about the CCF_1. For example, the CCF_1 may send an identifier of the CCF_1 and attribute description information of the CCF_1 to the CCF_2. However, because the CCF_1 is a logical unit disposed in the MEC_1, the attribute description information of the CCF_1 still describes the information about the MEC_1. In a MEC discovery process, if the CCF_2 receives a MEC discovery request, and the information about the MEC_1 accords with target reference information in the discovery request, the MEC discovery response sent by the CCF_2 may carry the information about the CCF_1, so that a requester may further obtain the information about the MEC_1 based on the information about the CCF_1, and specifically, may obtain API information provided by the MEC_1.

After step 402, the second network element may invoke an API of the MEC based on the obtained information about the MEC, so that the MEC provides, for the third-party application, a service that satisfies a service requirement of the third-party application. Specifically, if the information about the MEC obtained by the second network element includes the API information provided by the MEC, the second network element may invoke the corresponding API based on a required service type and service area, that is, send an API invocation request to the MEC. The request includes an API identifier. If the information about the MEC obtained by the second network element does not include the API information provided by the MEC, the second network element may send an API discovery request to the MEC (or a CCF corresponding to the MEC), to request to obtain the API information provided by the MEC; and send the API invocation request to the MEC after obtaining the API information.

In the foregoing embodiments of this application, by interacting with the first network element, the second network element obtains the information about the MEC, that is, implements the MEC discovery process, so that the second network element can communicate with the MEC based on the obtained information about the MEC, thereby using a capability of the MEC to provide the third-party application with the service that satisfies the service requirement of the third-party application. Further, the MEC and the second network element may belong to different domains, for example, belong to different operators, so that a solution of invoking the MEC across operators is implemented, and a requirement that the third-party application can provide a service for users of different operators is satisfied.

For ease of understanding of the foregoing embodiments of this application, the following provides descriptions by using examples with reference to the accompanying drawings. In the following embodiments, descriptions are provided by using an example in which a domain concept is a PLMN. Certainly, a PLMN in the following embodiments may alternatively be replaced with another domain concept.

Figure 5A:
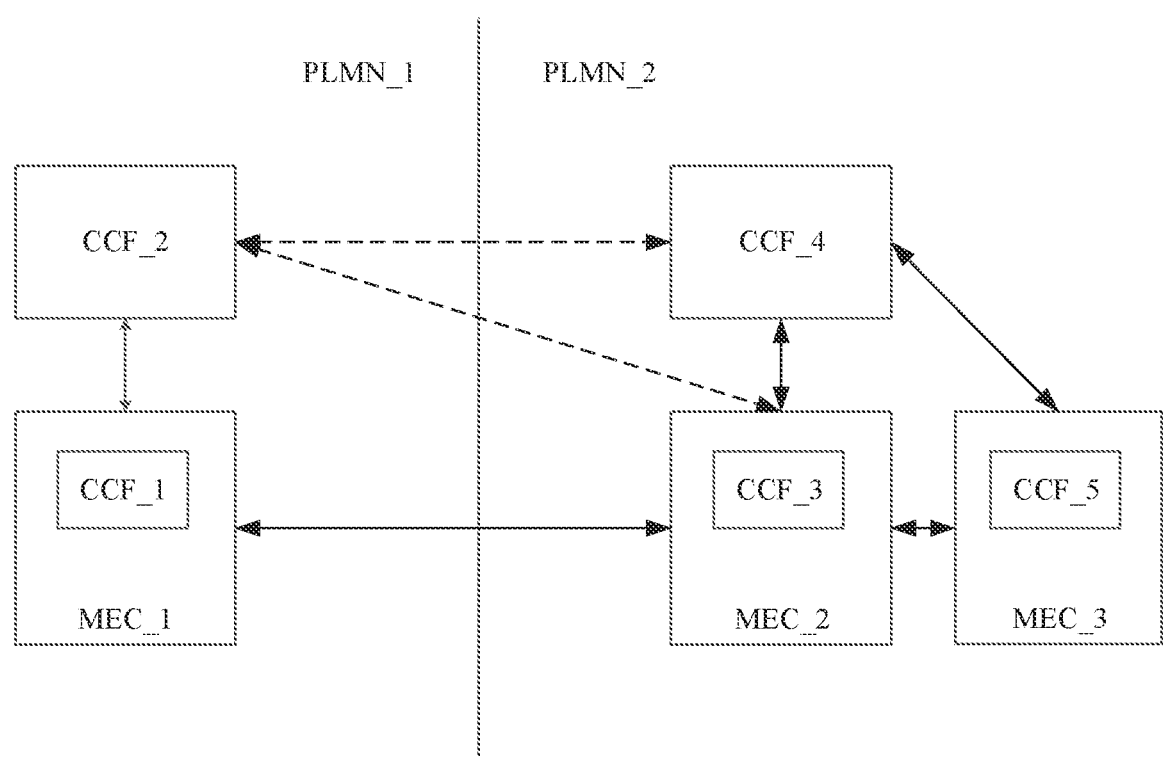
FIG. 5(a) to FIG. 5(c) are a first specific embodiment according to this application.

FIG. 5(a) is a network deployment scenario to which the foregoing embodiments of this application are applicable. As shown in the figure, a MEC_1 (a first network element) and a highest-level CCF (namely, a CCF_2 that is a second network element) are deployed in a PLMN_1. A logical unit CCF_1 having a CCF function is disposed in the MEC_1. A MEC_2 and a highest-level CCF (namely, a CCF_4) are deployed in a PLMN_2. In addition, a logical unit CCF_3 having the CCF function is disposed in the MEC_2.

Figure 5B:
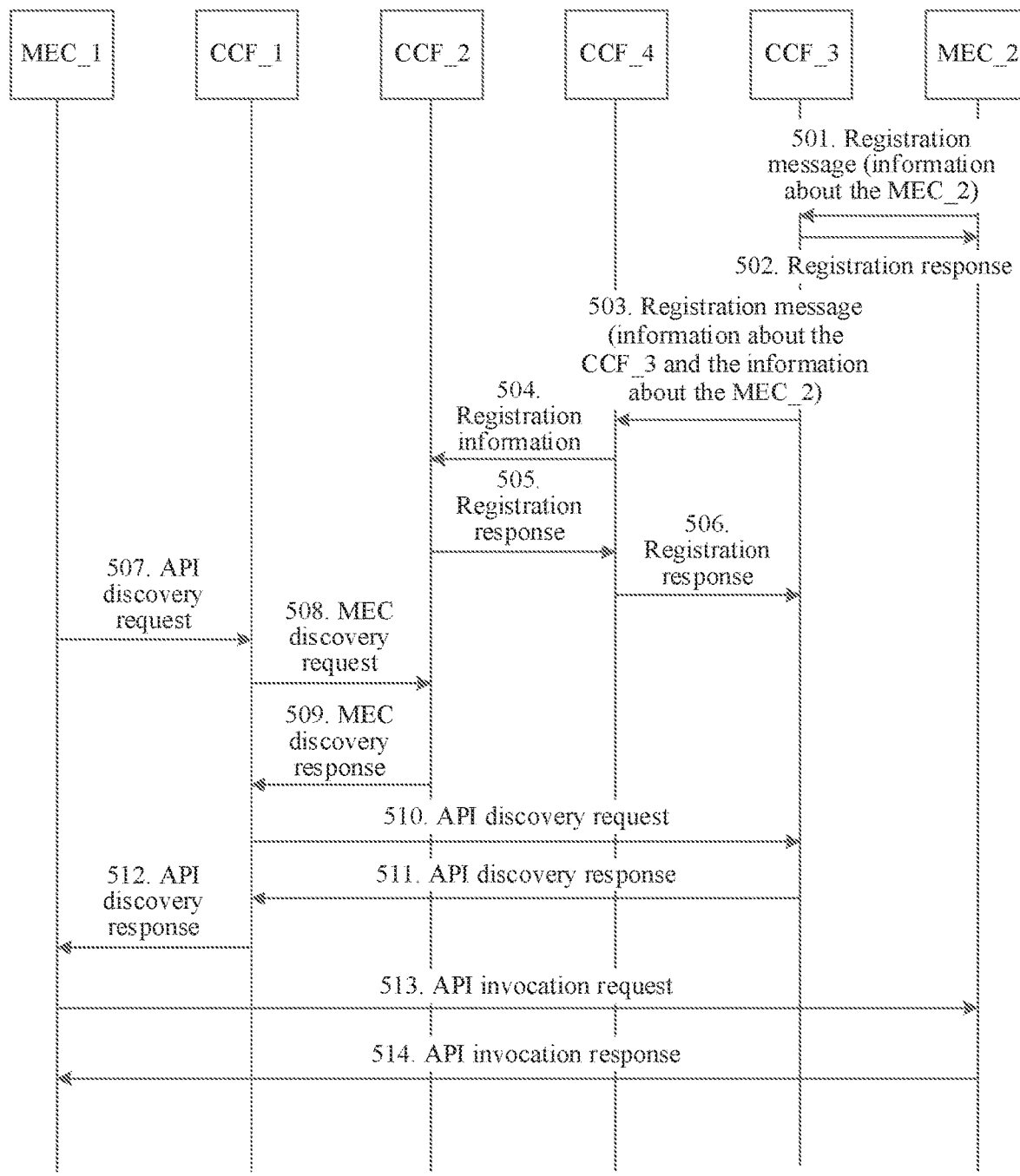

In the scenario shown in FIG. 5(a), a schematic flowchart of a MEC information obtaining method may be shown in FIG. 5(b).

Step 501: The MEC_2 sends MEC registration information to the CCF_3.

The registration information may include an identifier of a MEC_2, service area information of the MEC_2, API information provided by the MEC_2, and an identifier of the PLMN_2. The registration information includes the API information. Therefore, the registration information may be carried in an API publish request for sending. Alternatively, the registration information may be sent in a MEC publish request. In this case, the MEC_2 may be an instance of an AEF in a CAPIF.

Step 502: The CCF_3 sends a MEC registration response to the MEC_2.

The MEC registration response is used to respond to the registration information sent by the MEC_2, and the response may further include registration success or registration failure indication information.

Step 503: The CCF_3 sends a MEC registration request to a CCF_4.

The request may carry information about a CCF granularity, that is, carry information about the CCF_3 (for example, an identifier, location information, service area information, and the PLMN_2 identifier) and the APT information; or may carry information about a MEC granularity, that is, carry an identifier of the MEC_2, service area information of the MEC_2, API information provided by the MEC_2, and the identifier of the PLMN_2. Certainly, the information about the CCF_3 and the information about the MEC_2 may be all sent to the CCF_4.

Because there is a commercial subscription relationship between the PLMN_1 and the PLMN_2, and the PLMN_1 and the PLMN_2 are allowed to register MEC information with each other, step 504 is performed.

Step 504: The CCF_4 sends MEC registration information to the CCF_2.

Specifically, the registration information may include the information about the CCF_3 carried in step 503. The information about the CCF_3 sent in step 504 may be less than the information sent in step 503.

Step 505: The CCF_2 sends a MEC registration response to the CCF_4.

The MEC registration response is used to respond to the registration information sent by the CCF_4, and the response may include registration success or registration failure indication information.

Step 506: The CCF_4 sends a MEC registration response to the CCF_3.

The MEC registration response is used to respond to the registration information sent by the CCF_3, and the response may include registration success or registration failure indication information.

Step 506 may alternatively be performed after step 503.

Correspondingly, the MEC_1 may also complete registration processes on the CCF_1, the CCF_2, and the CCF_4 based on the foregoing procedure, and details are not described herein again.

Step 507: The MEC_1 sends an API discovery request to the CCF_1.

For example, if the MEC_1 determines, based on a service coverage area requirement of a third-party application, to invoke an API that is in the PLMN_2 and can provide a service for a service area A, to serve the third-party application, step 507 is performed. Optionally, the step of determining to invoke an API that is in the PLMN_2 and can provide a service for a service area A, to serve the third-party application may alternatively be performed by the CCF_1 or the CCF_2.

The request may include target reference information. In this embodiment, an example in which the target reference information is information about the service area A and the identifier of the PLMN_2 is used for description. In this case, the request message is used to indicate that the MEC_1 requests to invoke the API that is in the PLMN_2 and can provide the service for the area A. In this case, the MEC_1 may be considered as an instance of an API invoker in the CAPIF.

Further, the API discovery request may further carry an identifier of the MEC_1, and the identifier of the MEC_1 is used as an identifier of the API requester.

If the CCF_1 determines that the CCF_1 cannot provide an API corresponding to the target reference information, for example, the CCF_1 determines, based on the information about the service area A and the identifier of the PLMN_2, that another MEC is required to perform coprocessing, step 508 is performed.

Step 508: The CCF_1 sends a MEC discovery request to the CCF_2.

The MEC discovery request is used to request to obtain information about a MEC that can provide the API that can serve the area A.

Step 509: The CCF_2 sends a MEC discovery response to the CCF_.

For example, the CCF_2 determines, based on the received request message and the obtained information about the MEC, that a MEC corresponding to the CCF_3 satisfies the request. Therefore, the CCF_2 adds the information about the CCF_3 to the MEC discovery response and sends the MEC discovery response to the CCF_1.

The information about the CCF_3 obtained by the CCF_2 may include or may not include API information provided by the MEC_2 corresponding to the CCF_3. Therefore, the discovery response sent by the CCF_2 may not include the API information provided by the MEC_2 corresponding to the CCF_3. If the MEC discovery response does not include the API information provided by the MEC_2, step 510 is performed; or if the MEC discovery response includes the API information provided by the MEC_2, step 512 is performed.

Step 510: The CCF_1 sends the API discovery request to the CCF_3.

Step 511: The CCF_3 sends an API discovery response to the CCF_1.

The response includes API information that can be provided by the CCF_1 (namely, the API information that can be provided by the MEC_2). Alternatively, if the API discovery request sent in step 510 further includes API condition information: the information about the service area A and the identifier of the PLMN_2, and indicates a request to obtain the API that is in the PLMN_2 and can provide the service for the area A, the API discovery response sent by the CCF_3 may alternatively include only information about the API corresponding to the target reference information.

Step 512: The CCF_1 sends an API discovery response to the MEC_1.

Step 513: The MEC_1 sends an API invocation request to the MEC_3.

The request includes an identifier of an API requested to be invoked.

Step 514: The MEC_3 sends an API invocation response to the MEC_1.

In the foregoing embodiment, a process of registering the information about the MEC_2 with the CCF_2 is performed by the CCF_4. In another possible implementation, the CCF_3 may alternatively directly register the information about the MEC_2 with the CCF_2.

Figure 5C:
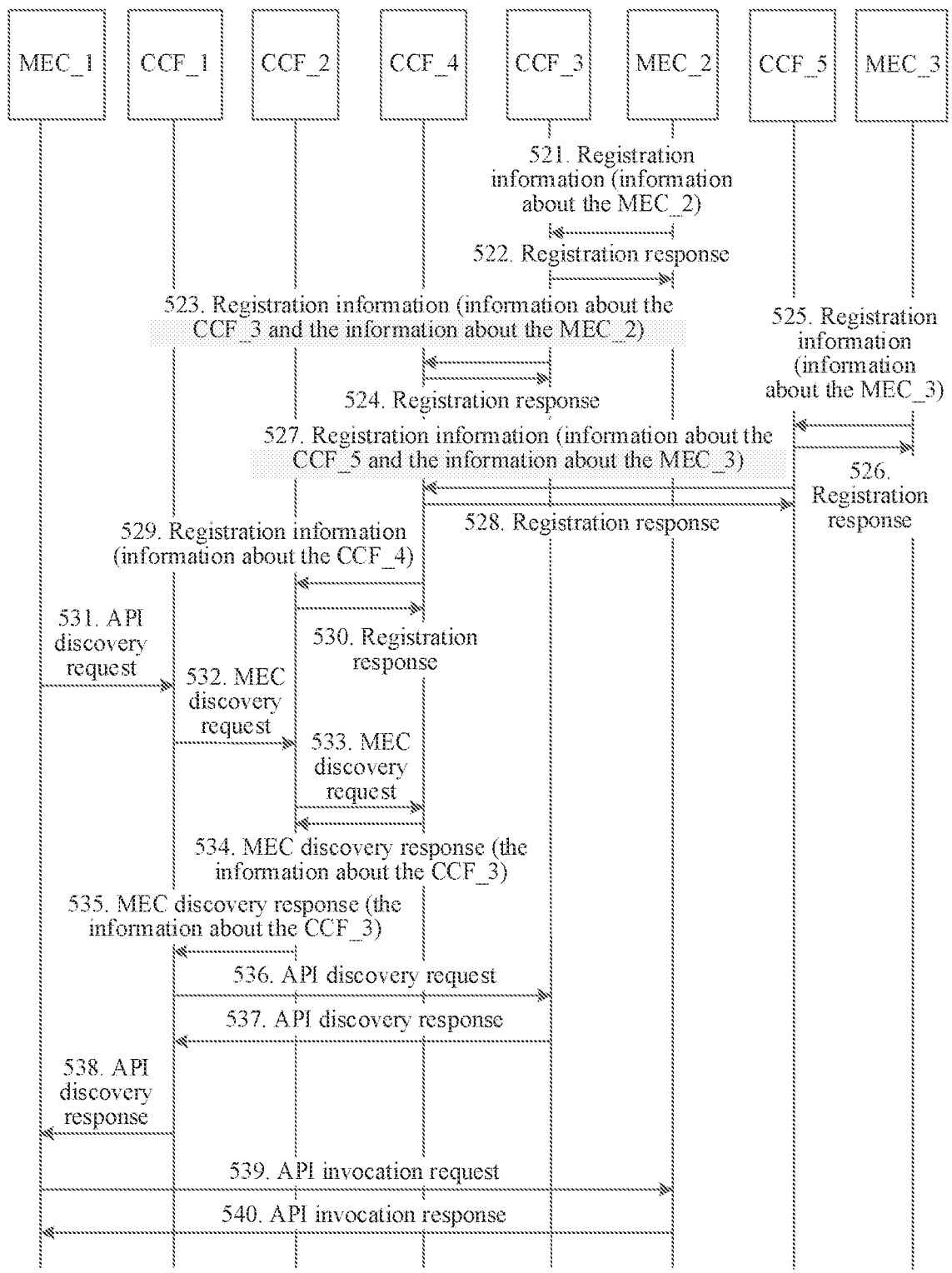

In the scenario shown in FIG. 5(*a*), a schematic flowchart of a MEC information obtaining method may be shown in FIG. 5(*c*).

Step 521 to step 524 are the same as step 501 to step 504 in the foregoing.

Step 525 to step 528: Register information about the MEC_3 with a CCF_5 and the CCF_4. Step 525 to step 528 are similar to step 501 to step 504, and details are not described herein again.

Step 529: The CCF_4 sends registration information to the CCF_2.

The registration information may include an identifier of the CCF_4 and attribute description information of the CCF_4.

Content included in attribute description information of a CCF is similar to content included in the attribute description information of the MEC, and may include service area information, capability description information, a domain identifier, and the like. Specifically, the attribute description information of the CCF_4 may be used to describe an integrated attribute of the MEC_2 and the MEC_3. For example: a service area of the MEC_2 is the area A, and capability description information includes a broadcast service; and a service area of the MEC_3 is the area B, and capability description information is a V2X service. In this case, service area information of the CCF_4 may include the area A+the area B. and the capability description information may include the broadcast service+the V2X service.

Step 530: The CCF_2 sends a registration response to the CCF_4.

Step 531: The MEC_1 sends an API discovery request to the CCF_1.

For example, if the MEC_1 requests, based on a requirement of the third-party application for providing a service for a user of the PLMN_2 in the area A, to obtain the information about the API that is in the PLMN_2 and can provide the service for the area A, the request may include API condition information: the information about the service area A and the identifier of the PLMN_2, to indicate that the MEC_1 requests to obtain the API that is in the PLMN_2 and can provide the service for the area A.

If the CCF_1 determines that there is no API that satisfies the API condition information, step 532 is performed.

Step 532: The CCF_1 sends a MEC discovery request to the CCF_2.

The MEC discovery request is used to request to obtain information about a MEC that can provide the API that satisfies the foregoing condition information.

For example, if the CCF_2 determines, based on the received information about the CCF_4, that the CCF_4 includes the MEC that provides the corresponding API that satisfies the API condition information, but does not know which MEC specifically provides the API, or the CCF_2 determines that the CCF_4 corresponding to the identifier of the PLMN_2 includes the MEC that satisfies the API condition information, step 534 is performed.

Step 533: The CCF_2 sends a MEC discovery request to the CCF_4.

The request includes the information about the service area A.

If the CCF_4 determines that a MEC corresponding to the CCF_3 can provide the API that satisfies the API condition information, step 534 is performed.

Step 534: The CCF_4 sends a MEC discovery response to the CCF_2.

The response includes the information about the CCF_3.

Subsequent steps 535-540 are similar to step 509 to step 514, and details are not described again.

Figure 6A:
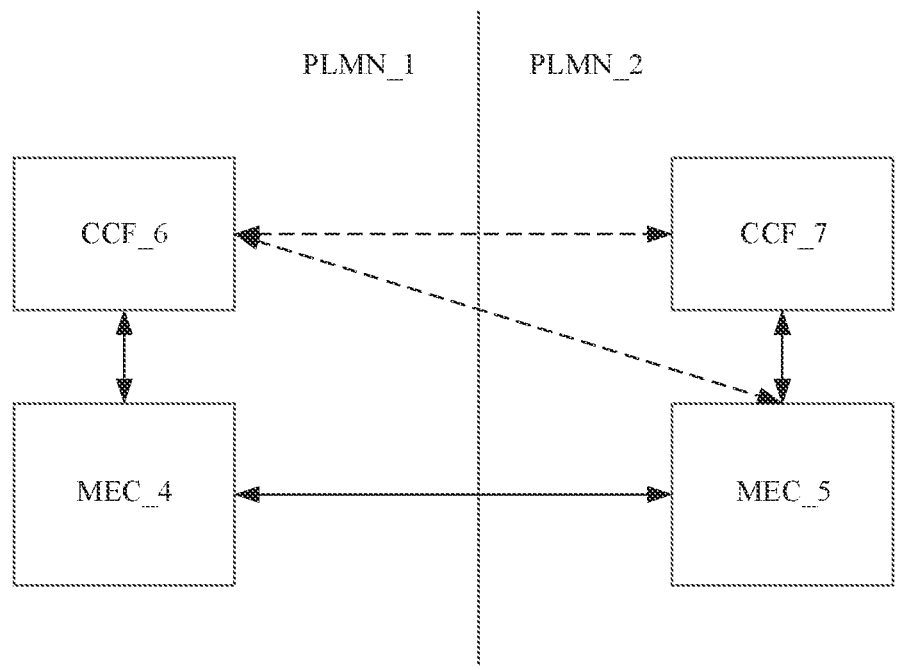
FIG. 6(a) to FIG. 6(c) are a second specific embodiment according to this application.

FIG. 6(a) is a network deployment scenario to which the foregoing embodiments of this application are applicable. As shown in the figure, a MEC_4 (first network element) and a CCF_6 (second network element) are deployed in a PLMN_; and a MEC_5 and a CCF_7 are deployed in a PLMN_2.

Figure 6B:
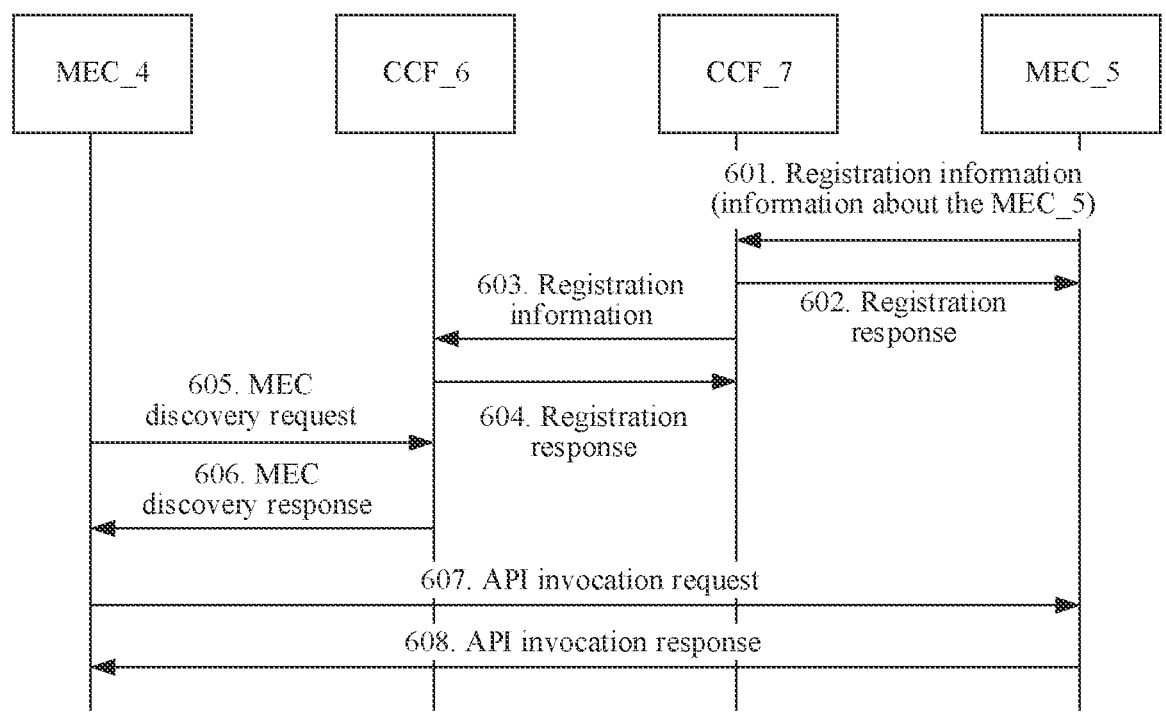

In the scenario shown in FIG. 6(a), a schematic flowchart of a MEC information obtaining method may be shown in FIG. 6(b). In this embodiment, an example in which a MEC capability is a broadcast service capability is used for description.

Step 601: The MEC_5 sends MEC registration information to the CCF_7.

The registration information may include an identifier of the MEC_5, service area information of the MEC_5. API information provided by the MEC_5, and an identifier of the PLMN_2. In this case, the MEC_4 may be considered as an instance of an AEF and an APF in a CAPIF.

Step 602: The CCF_7 sends a MEC registration response to the MEC_5.

Because the PLMN_1 and the PLMN_2 have pre-agreed that the PLMN_1 and the PLMN_2 may register MEC information with each other, step 603 is performed.

Step 603: The CCF_7 sends registration information of the MEC_5 to the CCF_6.

Step 604: The CCF_6 sends a MEC registration response to the CCF_7.

Similarly, the MEC_4 may also complete registration processes on the CCF_6 and the CCF_7 based on the foregoing procedure, and details are not described herein again. In addition, a CCF logical unit may alternatively be disposed in the MEC_4, to form an architecture similar to that in FIG. 5(a). For interaction between the two in registration and discovery processes, refer to the embodiment shown in FIG. 5(b) and FIG. 5(c).

Step 605: The MEC_4 sends a MEC discovery request to the CCF_6.

For example, if the MEC_4 determines, based on a requirement of a third-party application for providing a broadcast service for a user in the PLMN_2, that a MEC that is in the PLMN_2 and can provide the broadcast service needs to be obtained, target reference information included in the request may include indication information of the broadcast service and the identifier of the PLMN_2.

Step 606: The CCF_6 sends a MEC discovery response to the MEC_4.

The MEC discovery response carries information about the MEC_5 corresponding to the target reference information.

For example, if the CCF_6 determines, based on MEC information obtained by the CCF_6, that an identifier of a domain to which the MEC_5 belongs is the PLMN_2, and the MEC_5 can provide the broadcast service, step 606 is performed.

Step 607: The MEC_4 sends an API invocation request to the MEC_5.

The API invocation request includes an identifier of an API that the MEC_4 requests to invoke.

Step 608: The MEC_5 sends an API invocation response to the MEC_4.

In the foregoing embodiment, a process of registering the information about the MEC_5 with the CCF_6 is performed by the CCF_7. In another possible implementation, the MEC_5 may alternatively directly register the information about the MEC_5 with the CCF_6.

Figure 6C:
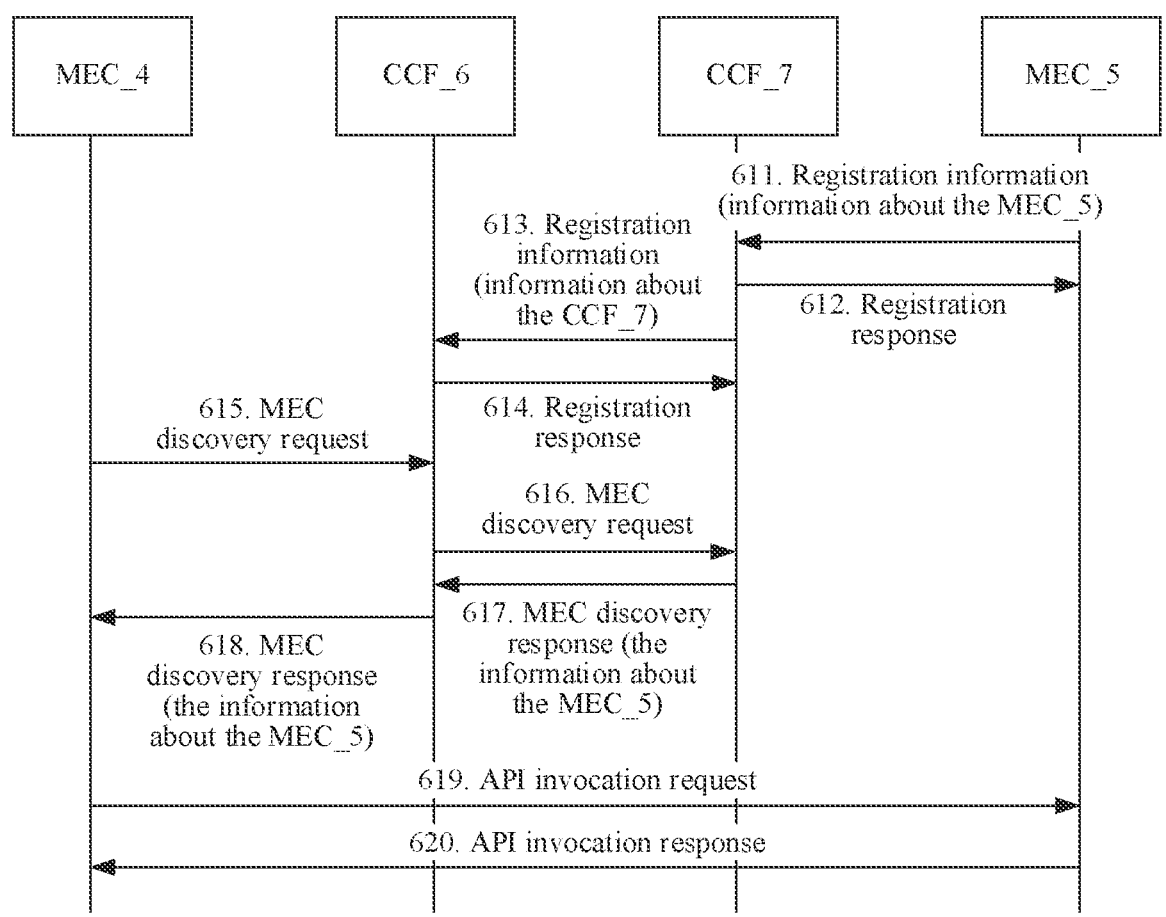

In the scenario shown in FIG. 6(a), a schematic flowchart of a MEC information obtaining method may alternatively be shown in FIG. 6(c).

Step 611: The MEC_5 sends MEC registration information to the CCF_7.

Step 612: The CCF_7 sends a MEC registration response to the MEC_5.

Step 613: The CCF_7 sends registration information to the CCF_6.

The registration information includes an identifier of the CCF_7 and attribute description information of the CCF_7. The attribute description information of the CCF_7 is similar to the attribute description information of the CCF_4.

Because the PLMN_1 and the PLMN_2 have pre-agreed that information-related registration may be performed, the CCF_7 sends the registration information to the CCF_6.

Step 614: The CCF_6 sends a MEC registration response to the CCF_7.

Step 615: The MEC_4 sends a MEC discovery request to the CCF_6.

The request includes the indication information of the broadcast service and the identifier of the PLMN_2.

For example, if the MEC_4 determines, based on a service requirement that is provided by the third-party application and that is for sending a broadcast message for a user in the PLMN_2, that the MEC_4 needs to cooperate with a MEC that is in the PLMN_2 and can provide the broadcast service, to provide a service for the third-party application, the MEC_4 sends the MEC discovery request to the CCF_6.

Step 616: The CCF_6 sends a MEC discovery request to the CCF_7.

The request includes the indication information of the broadcast service.

For example, when determining that the CCF_7 includes the MEC that can provide the broadcast service, the CCF_6 may further send the MEC discovery request to the CCF_7, to obtain information about the MEC that provides the service.

Step 617: The CCF_7 sends a MEC discovery response to the CCF_6.

For example, the CCF_7 determines that the MEC_5 can provide the broadcast service, and the MEC discovery response may include the identifier of the MEC_5 and information about an API that provides the broadcast service.

Step 618: The CCF_6 sends a MEC discovery response to the MEC_4.

The discovery response includes the identifier of the MEC_5 and the information about the API that provides the broadcast service.

Step 619: The MEC_4 sends an API invocation request to the MEC_5.

Step 620: The MEC_5 sends an API invocation response to the MEC_4.

Figure 7A:
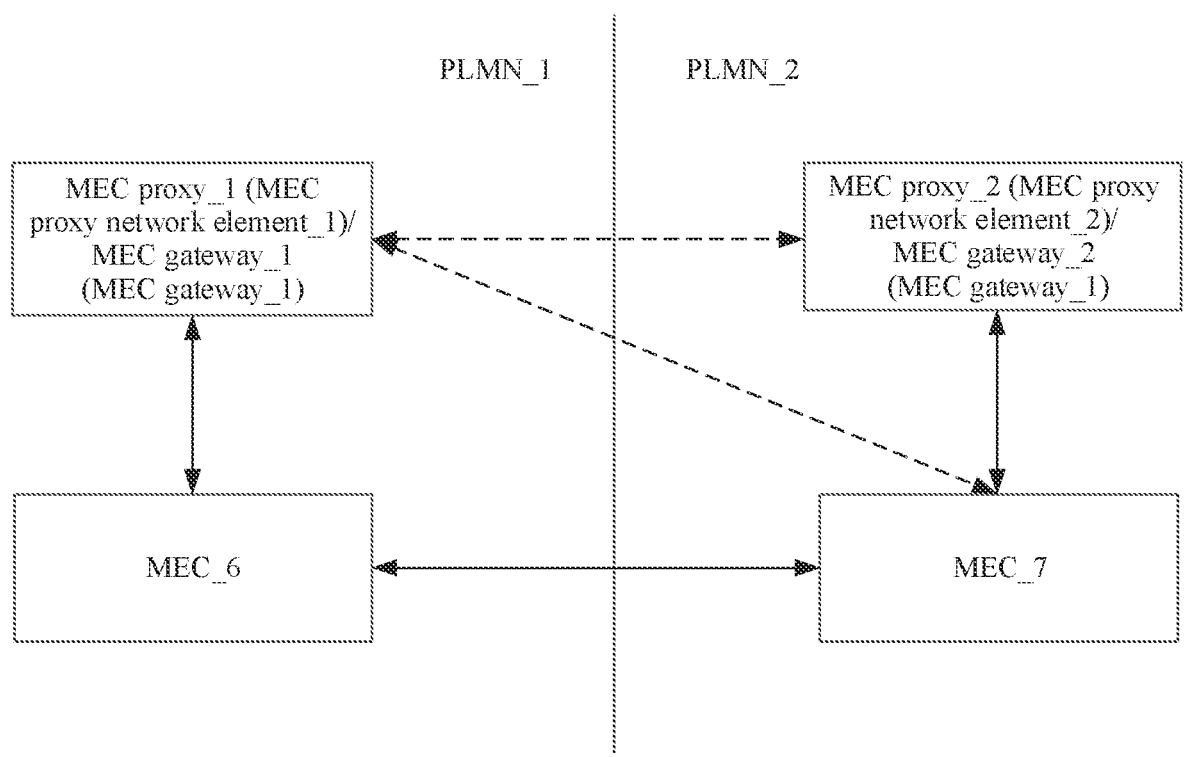
FIG. 7(a) to FIG. 7(c) are a third specific embodiment according to this application.
Figure 7B:
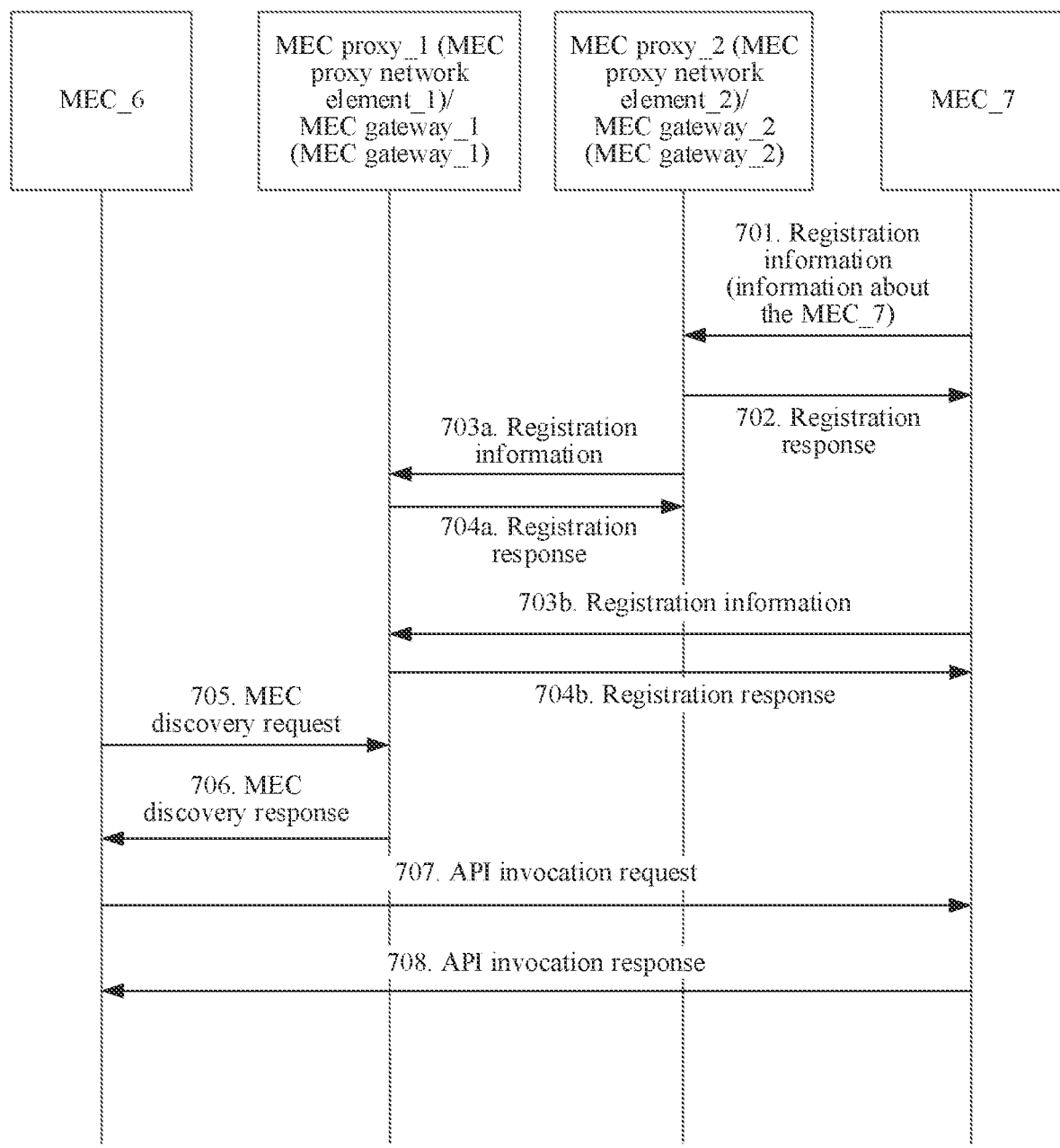
Figure 7C:
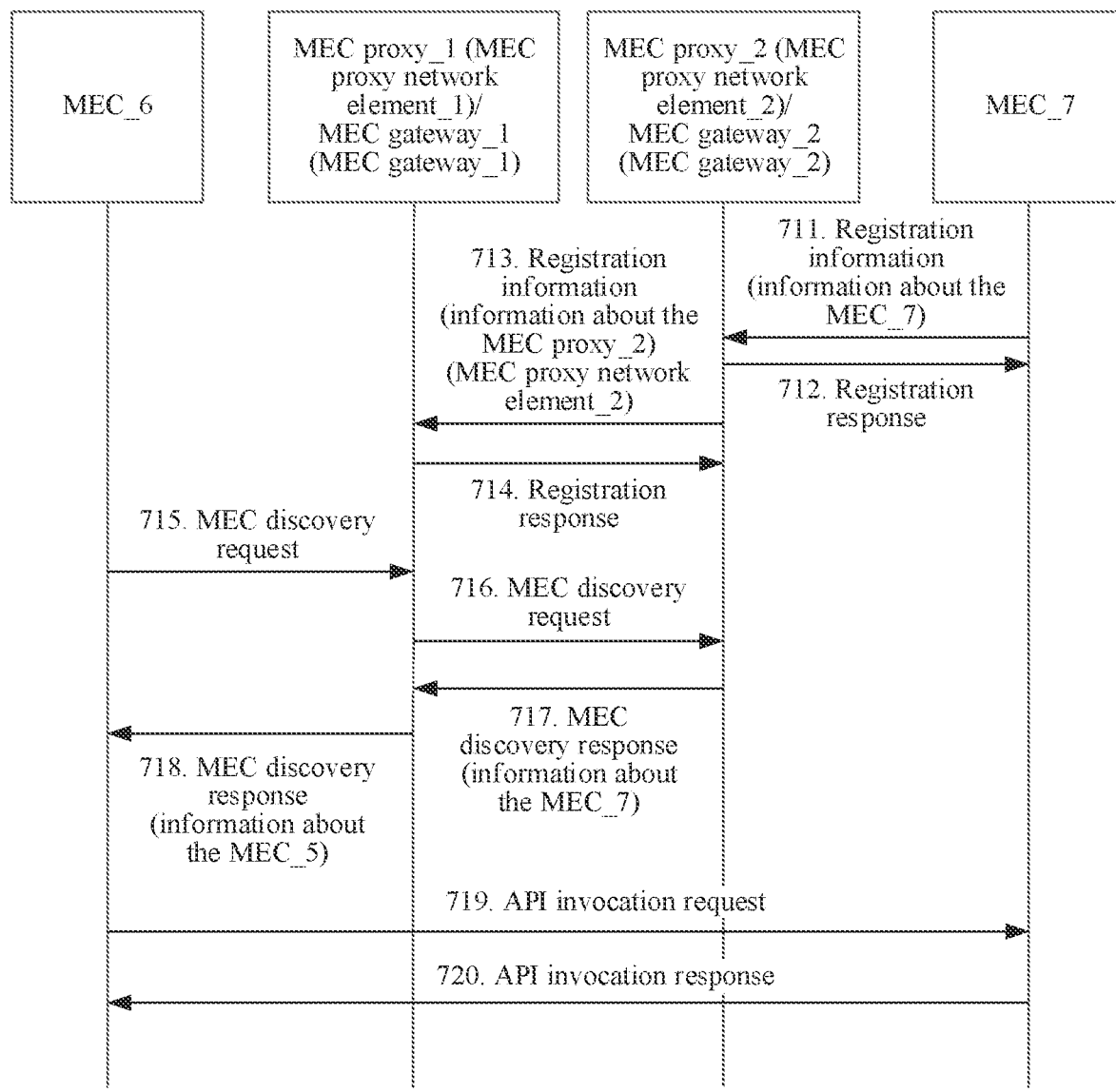

FIG. 7(*a*) is a network deployment scenario to which the foregoing embodiments of this application are applicable. As shown in the figure, a MEC_6 (first network element) and a MEC proxy network element MEC proxy_1 (second network element) are deployed in a PLMN_1; and a MEC_7 and a MEC proxy network element (MEC proxy_2) are deployed in a PLMN_2. In this scenario, a MEC proxy network element is deployed in each PLMN, MEC information is registered in the MEC proxy network element, and when information about another MEC needs to be obtained, a MEC discovery process is initiated to the MEC proxy network element.

In addition, in FIG. 7(*a*), the MEC proxy network elements may alternatively be replaced with MEC gateways (MEC gateway), MEC repository functions (MEC repository function), or NEFs. The MEC proxy network elements are used as an example for description in the following.

In the scenario shown in FIG. 7(*a*), a schematic flowchart of a MEC information obtaining method may be shown in FIG. 7(*b*).

Step 701: The MEC_7 sends MEC registration information to the MEC proxy_2.

The registration information may include an identifier of the MEC_7, service area information of the MEC_7, API information provided by the MEC_7, and an identifier of the PLMN_2.

Step 702: The MEC proxy_2 sends a MEC registration response to the MEC_7.

Because the PLMN_1 and the PLMN_2 have pre-agreed that the PLMN_1 and the PLMN_2 may register MEC information with each other, when the MEC information is registered across the PLMNs, the MEC information may be shown in steps 703*a* and 704*a*, or may be shown in steps 703*b* and 704*b*.

Step 703*a*: The MEC proxy_2 sends registration information of the MEC_6 to the MEC proxy_1.

Step 704*a*: The MEC proxy_1 sends a MEC registration response to the MEC proxy_2.

Step 703*b*: The MEC_7 sends the MEC registration information to the MEC proxy_1.

Step 704*b*: The MEC proxy_1 sends a MEC registration response to the MEC_7.

Similarly, the MEC_6 may also complete registration processes on the MEC proxy_1, and the MEC proxy_2 based on the foregoing procedure, and details are not described herein again.

Step 705: The MEC_6 sends a MEC discovery request to the MEC proxy_1.

For example, the request includes indication information of a traffic charging service and the identifier of the PLMN_2, and indicates that the MEC_6 requests to obtain information about a MEC that is in the PLMN_2 and can provide the traffic charging service.

Step 706: The MEC proxy_1 sends a MEC discovery response to the MEC_6.

The MEC discovery response carries information about the MEC_7 that can provide the traffic charging service.

For example, the MEC proxy_1 determines, based on the received MEC discovery request and the obtained information about the MEC, that the MEC_7 satisfies the request. Therefore, the MEC proxy_1 adds the information about the MEC_7 to the MEC discovery response and sends the MEC discovery response to the MEC_6.

Step 707: The MEC_6 sends an API invocation request to the MEC_7.

The invocation request may include an identifier of an API requested to be invoked.

Step 708: The MEC_7 sends an API invocation response to the MEC_6.

In the scenario shown in FIG. 7(*a*), a schematic flowchart of a MEC information obtaining method may alternatively be shown in FIG. 7(*c*). A MEC information registration process may be consistent with the registration process shown in 7(*b*), or the cross-PLMN registration may not be performed, to be specific, the information about the MEC_7 may not be registered with the MEC proxy_1, or the information about the MEC_6 may not be registered with the MEC proxy_2. This is not limited in this embodiment of this application.

Step 711 to step 720 are similar to step 611 to step 620, and a difference lies in that the CCFs are replaced with the MEC proxies. Details are not described one by one herein again.

FIG. 8(*a*) is a network deployment scenario to which the foregoing embodiments of this application are applicable. As shown in the figure, a MEC_8 (first network element) is deployed in a PLMN_; and a MEC_9, a NEF_1 (or a MEC gateway_3 or a MEC proxy network element, serving as a second network element), and an NRF_1 are deployed in a PLMN_2. A CCF logical unit may alternatively be disposed in the MEC_8. For interaction between the CCF logical unit and the MEC_8 in registration and discovery processes, refer to the embodiment shown in FIG. 5.

In the scenario shown in FIG. 8(*a*), a schematic flowchart of a MEC information obtaining method is shown in FIG. 8(*b*).

Step 801: The MEC_9 sends MEC registration information to the NRF_1.

The registration information may include an identifier of the MEC_9, service area information of the MEC_9, API information provided by the MEC_9, and an identifier of the PLMN_2.

Step 802: The NRF_1 sends a MEC registration response to the MEC_9.

Step 803: The MEC_8 sends a MEC discovery request to the NEF_1.

For example, the MEC_8 determines, based on a service requirement of a third-party application, that a MEC that is in the PLMN_2 and can provide a V2X service needs to be found. The MEC_8 sends the MEC discovery request to the NEF_1. The request includes indication information of the V2X service. In this case, the MEC_8 may be considered as an instance of an API requester in a CAPIF. This embodiment is described by using an example in which a MEC capability is the V2X service.

Step 804: The NEF_1 sends an NF discovery request to the NRF_1.

The request may include indication information indicating that a target network element is a MEC, to instruct to search for a MEC-type network element, and further includes the indication information of the V2X service, to further instruct to search for a MEC-type network element that provides the V2X service.

Step 805: The NRF_1 sends an NF discovery response to the NEF_1.

The NF discovery response carries information about the MEC_9 that satisfies the request of the NEF_1.

For example, the NRF_1 determines, based on the received NEF discovery request and the obtained information about the MEC, that the MEC_9 satisfies the request of the NEF_1. Therefore, the NRF_1 adds the information about the MEC_9 to the NF discovery response and sends the NF discovery response to the NEF_1.

Step 806: The NEF_1 sends a MEC discovery response to the MEC_8.

The response carries the information about the MEC_9.

Step 807: The MEC_8 sends an API invocation request to the MEC_9.

Because the information about the MEC_9 includes an API identifier provided by the MEC_9 and provided service information, the MEC_8 may send the API invocation request to the MEC_9. The API invocation request includes an identifier of an API to be invoked, to request to invoke the API corresponding to the identifier of the API.

Step 808: The MEC_9 sends an API invocation response to the MEC_8.

Figure 8A:
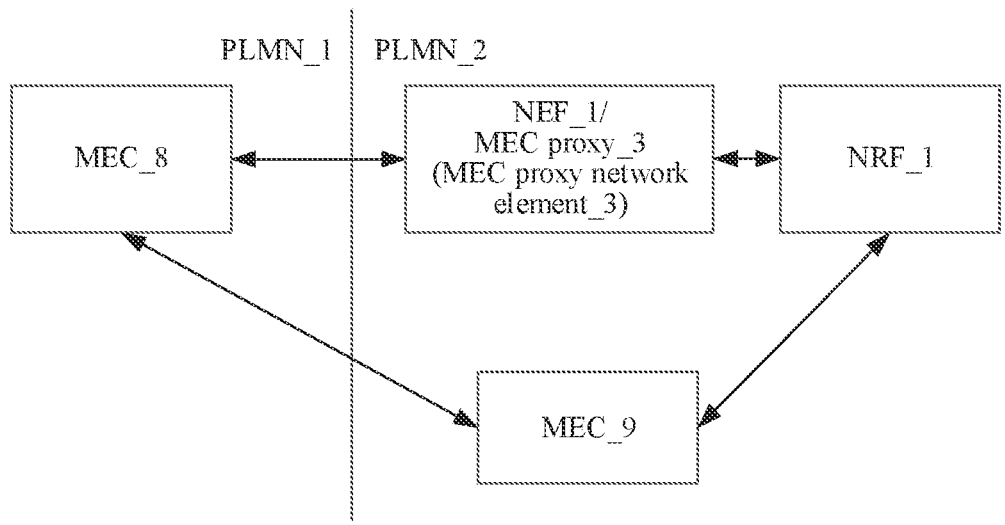
FIG. 8(a) to FIG. 8(d) are a fourth specific embodiment according to this application.
Figure 8B:
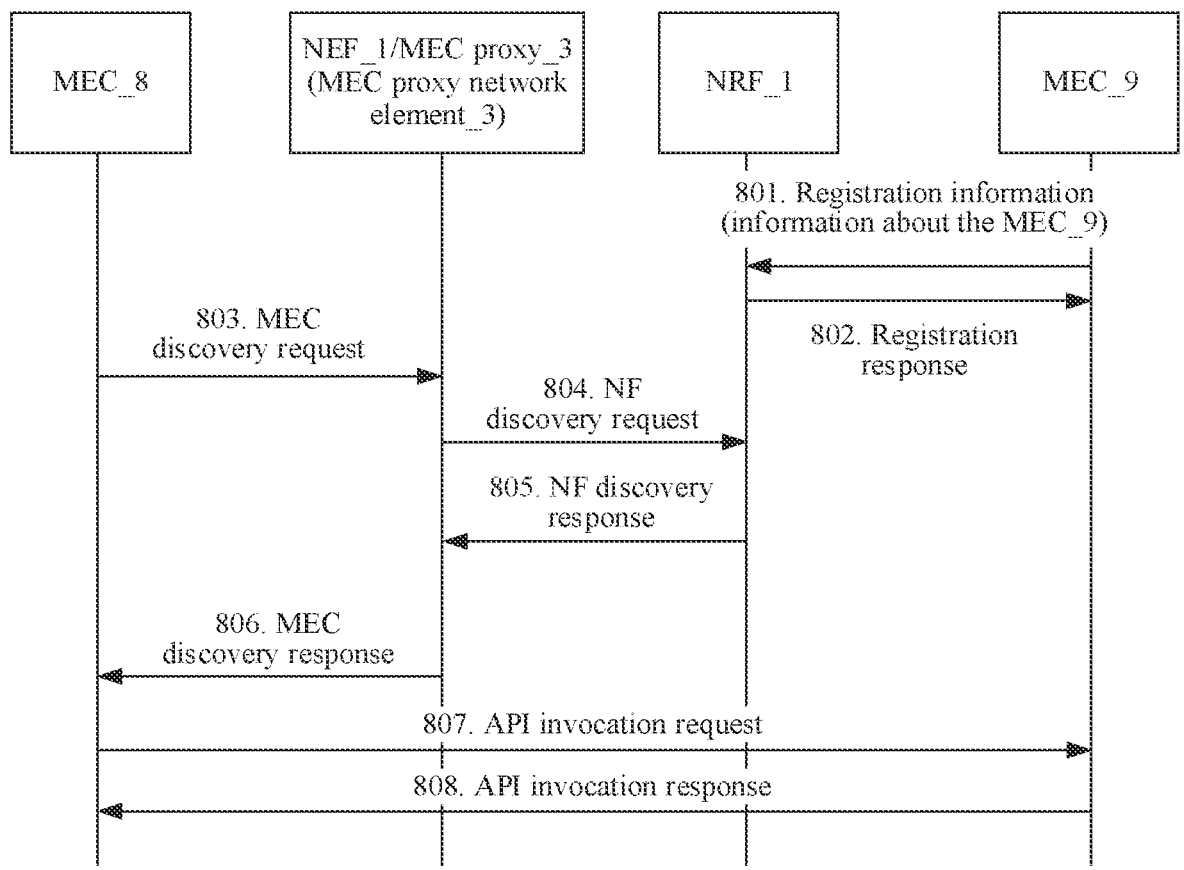
Figure 8C:
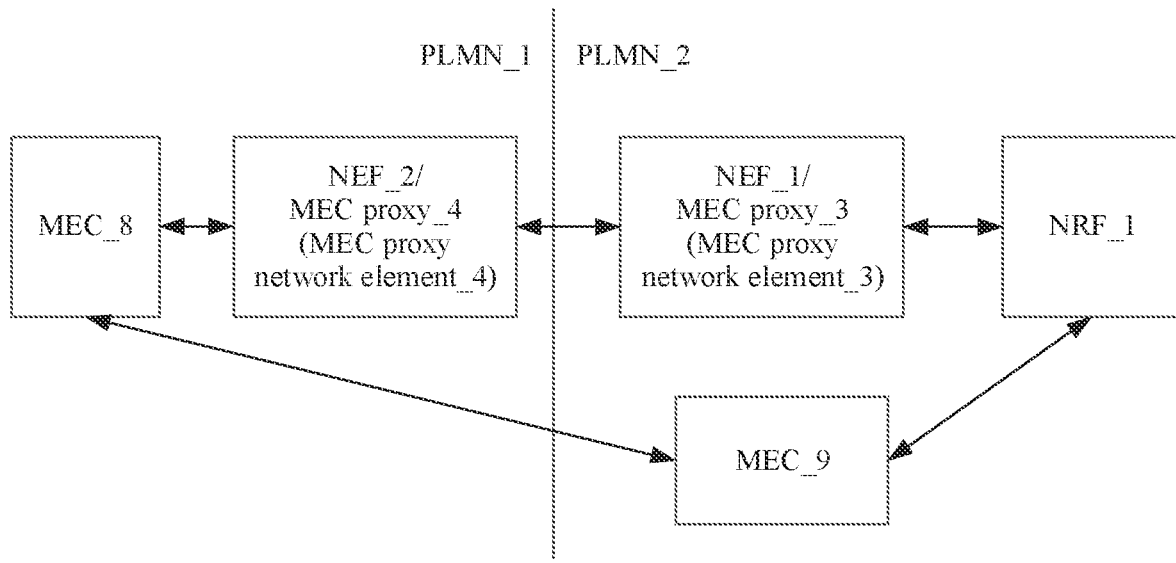
Figure 8D:
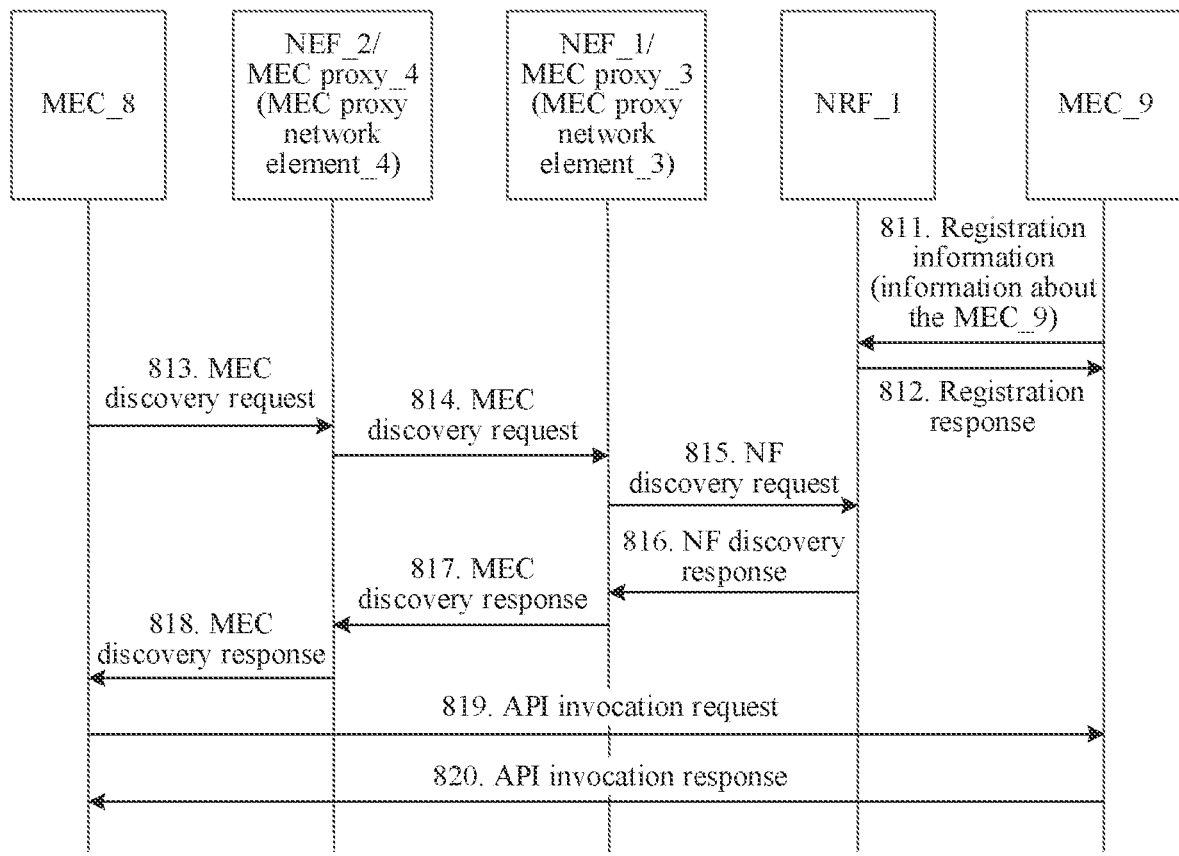

In addition, in the network deployment scenario shown in FIG. 8(a), the PLMN_1 may further include a NEF_2 (or a MEC gateway_4 or a MEC proxy network element). As shown in FIG. 8(c), in the scenario, a schematic flowchart of a MEC information obtaining method may be shown in FIG. 8(d).

Step 811: The MEC_9 sends MEC registration information to the NRF_1.

Step 812: The NRF_1 sends a MEC registration response to the MEC_9.

Step 813: The MEC_8 sends a MEC discovery request to the NEF_2.

The request includes the indication information of the V2X service and the identifier of the PLMN_2, and indicates a request to obtain information about a MEC that is in the PLMN_2 and can provide the V2X service.

For example, if the MEC_8 determines, based on a service requirement of a third-party application, that the MEC that is in the PLMN_2 and can provide the V2X service needs to be found, step 813 is performed.

Step 814: The NEF_2 sends a MEC discovery request to the NEF_1.

The request includes the indication information of the V2X service.

For example, the NEF_2 may send the MEC discovery request to the NEF_1 based on the identifier of the PLMN_2 in the discovery request.

Step 815: The NEF_1 sends an NF discovery request to the NRF_1.

The request may include indication information indicating that a target network element is a MEC, and further includes the indication information of the V2X service.

Step 816: The NRF_1 sends an NF discovery response to the NEF_1.

The NF discovery response carries the information about the MEC_9 that can provide the V2X service.

For example, the NRF_1 determines, based on the received NF discovery request and the obtained information about the MEC, that the MEC_9 satisfies the request. Therefore, the NRF_1 adds the information about the MEC_9 to the NF discovery response and sends the NF discovery response to the NEF_1.

Step 817: The NEF_1 sends a MEC discovery response to the NEF_2.

The response carries the information about the MEC_9.

Step 818: The NEF_2 sends a MEC discovery response to the MEC_8.

The response carries the information about the MEC_9.

Step 819: The MEC_8 sends an API invocation request to the MEC_9.

For example, the information about the MEC_9 includes API information provided by the MEC_9, and the API information includes an API identifier. The MEC_8 sends the API invocation request to the MEC_9, where the invocation request includes the API identifier, to instruct to invoke an API corresponding to the API identifier.

Step 820: The MEC_9 sends an API invocation response to the MEC_8.

Figure 9:
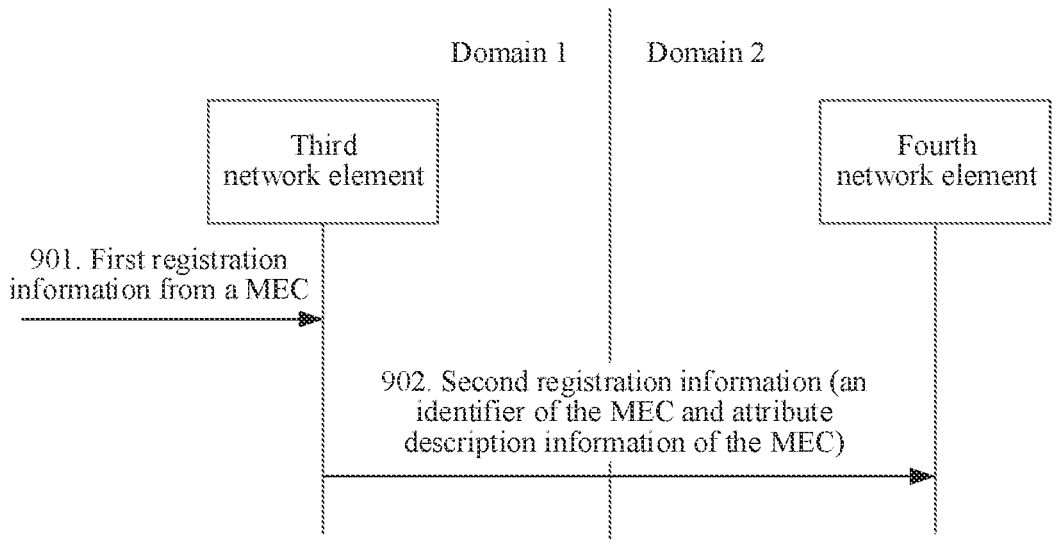
FIG. 9 is a schematic flowchart of another MEC information obtaining method according to an embodiment of this application.

Based on a same technical concept, an embodiment of this application further provides a MEC information registration method, to register MEC information with a network element in another domain. A schematic flowchart of the method may be shown in FIG. 9, and the method includes the following steps.

Step 901: A third network element receives first registration information from a MEC.

The third network element herein is configured to implement the MEC information registration method, and may be a network element that is the same as or different from the first network element in the foregoing embodiments of the MEC information obtaining method.

In some scenarios, the third network element may receive the first registration information sent by the MEC. Examples of the third network element include the CCF_6nd the CCF_7 in FIG. 6(a), the MEC proxy_1/the MEC gateway_1 and the MEC proxy_2/the MEC gateway_2 in FIG. 7(a), and the like. In some other scenarios, the first registration information, of the MEC, received by the third network element may alternatively be forwarded by another network element. For example, the registration information, of the MEC_2, that is received by the CCF_4 in FIG. 5(a) is sent by the CCF_3.

Specifically, the first registration information of the MEC may include addressing information of the MEC and attribute description information of the MEC. The attribute description information in this embodiment is similar to the attribute description information in the foregoing embodiments, and details are not described again.

Step 902: The third network element sends second registration information to a fourth network element based on the first registration information, where a domain to which the fourth network element belongs is different from a domain to which the third network element belongs.

A domain to which a network element belongs is similar to a concept of a "domain" in the foregoing embodiments, and details are not described herein again.

The second registration information includes the addressing information of the MEC and the attribute description information of the MEC. Certainly, when sending the attribute description information of the MEC to the fourth network element, the third network element may send, to the fourth network element, all attribute description information received by the third network element, or may send, to the fourth network element, some of attribute description information received by the third network element.

The addressing information of the MEC may refer to an identifier of the MEC, or the like, or may refer to an identifier of a CCF corresponding to the MEC, or the like. For example, in the scenario shown in FIG. 5(a), a CCF_3 logical unit is disposed on the MEC_2. In this case, when the CCF_4 registers the information about the MEC_2 with the CCF_2, the MEC registration information sent by the CCF_4 to the CCF_2 may include the identifier of the MEC_2 and the attribute description information of the MEC_2; or may not include the information about the MEC granularity, but include an identifier of the CCF_3 and attribute description information of the CCF_3 (where because the CCF_3 is deployed in the MEC_2, the attribute description information of the MEC_2 may be used as the attribute description information of the CCF_3).

Further, when the attribute description information of the MEC includes location information of the MEC or service area information of the MEC, when sending the location information or the service area information, the third network element may first determine the sending of the location information or the service area information, to determine whether the information may be directly sent or needs to be converted for sending. For example, if the information about the MEC is a cell identifier in a PLMN network of the MEC, the cell identifier cannot be identified by a network element in another PLMN. Therefore, when sending the information, the third network element may convert the information into location information generally used between different domains, for example, may convert the information into latitude and longitude information or administrative region information, so that the fourth network element can also identify the information.

In the foregoing embodiment, information about a MEC in one domain is registered with a network element in another domain. In this way, a network element can obtain information about a MEC in another domain. In a subsequent MEC information obtaining process, because information about a MEC in a second domain has been registered in a network element in a first domain, a MEC discovery process may be implemented only in the first domain, and there is no need to send a discovery request to a network element in the second domain, improving a response speed of MEC discovery.

In addition, the PLMN_2 may include a plurality of MECs, and each MEC registers information about the MEC with the CCF_4. MEC registration information sent by the CCF_4 to the CCF_2 may include an identifier of the CCF_4 and a set of capabilities of the plurality of MECs. For example, a service area of the MEC_2 is an area A, and the MEC_2 may be configured to provide a V2X service. A service area of the MEC_3 is an area B, and the MEC_3 may be configured to provide a charging service. In this case, the MEC registration information sent by the CCF_4 to the CCF_2 may include the identifier of the CCF_4 and service areas of the CCF_4, namely, the area A and the area B, capability description information of the CCF_4, namely, the V2X service and the charging service, a domain identifier of the CCF_4, namely, an identifier of the PLMN_2, and the like.

Figure 10:
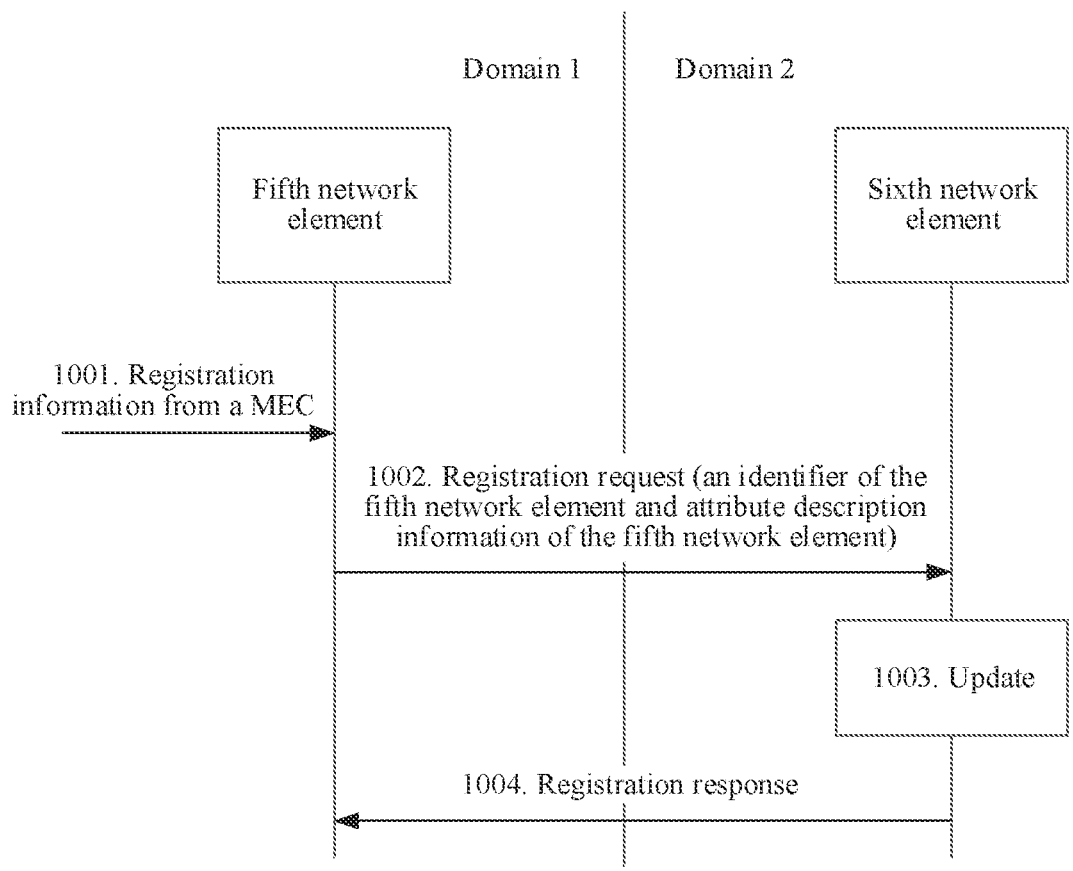
FIG. 10 is a schematic flowchart of still another MEC information obtaining method according to an embodiment of this application.

Based on a same technical concept, an embodiment of this application further provides an information registration method, to register MEC information with a network element in another domain. However, due to cross-domain registration, in consideration of aspects such as security, a MEC identifier is not carried during the registration. A schematic flowchart of the method may be shown in FIG. 10, and the method includes the following steps.

Step 1001: A fifth network element receives registration information from a MEC.

Figure 11:
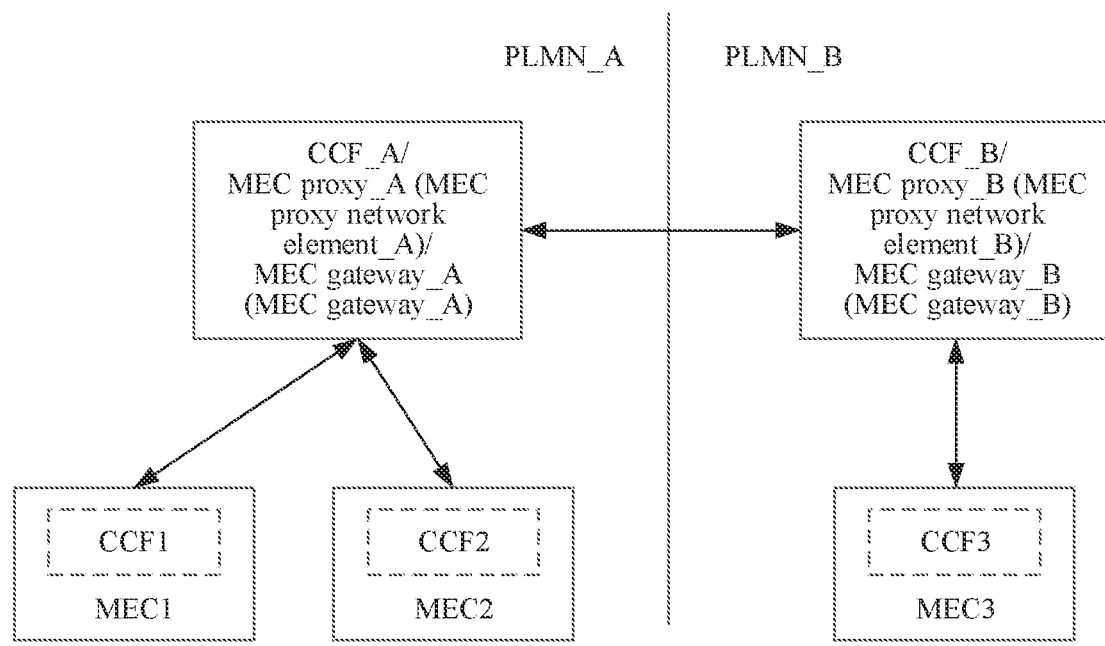
FIG. 11 is a fifth specific embodiment according to an embodiment of this application.

As shown in FIG. 11, the fifth network element in this embodiment may be a CCF, a MEC proxy, or a MEC gateway.

For example, if a CCF_A receives registration information from a MEC 1, the registration information may include an identifier of the MEC 1 and attribute description information of the MEC 1, or may include an identifier of a CCF 1 and attribute description information of the CCF 1 (where because the CCF 1 is deployed in the MEC 1, the attribute description information of the MEC 1 may be used as the attribute description information of the CCF 1). In addition, the CCF_A may also receive registration information from a MEC 2.

The attribute description information in this embodiment is similar to the attribute description information in the foregoing embodiments, and details are not described again.

Step 1002: The fifth network element sends a registration request to a sixth network element, where a domain to which the sixth network element belongs is different from a domain to which the fifth network element belongs, and the registration request includes an identifier of the fifth network element and attribute description information of the fifth network element, the attribute description information of the fifth network element is used to comprehensively describe attribute description information of one or more MECs registered on the fifth network element.

Because the fifth network element and the sixth network element belong to the different domains, for example, belong to different PLMNs, for security consideration, when sending the registration request to the sixth network element, the fifth network element may not send information about a MEC granularity, but send only a representation of the fifth network element and the attribute description information of the fifth network element.

With reference to FIG. 11, an example is used for description. The CCF_A in a PLMN_A may send registration information to a CCF_B in a PLMN_B, and the registration information may include an identifier of the CCF_A. If the identifier of the CCF_A can uniquely identify the CCF_A in the PLMN_A, the registration information may further include an identifier of the PLMN_A, and the CCF_A is uniquely identified based on <the identifier of the CCF_A+the identifier of the PLMN_A>.

In addition, the registration information further includes attribute description information of the CCF_A, namely, attribute description information of a MEC registered on the CCF_A. Specifically, the attribute description information may not specifically indicate attribute description information of a MEC, but indicate a total capability of a plurality of MECs registered on the CCF_A. For example, if the MEC 1 registered on the CCF_A has a broadcast capability and a traffic charging capability, and the MEC 2 has a capability of providing a V2X service, in the registration information sent by the CCF_A to the CCF_B, capability description information may include indication information of broadcast, traffic charging, and the V2X service.

The registration information may further include service area information of the MEC registered on the CCF_A. Specifically, the service area information may also not specifically indicate capability information of a MEC, but indicate a total service area of the plurality of MECs registered with the CCF_A. For example, if service areas of the MEC 1 registered on the CCF_A are an area A and an area B. and service areas of the MEC 2 are an area C and an area D, in the registration information sent by the CCF_A to the CCF_B, the service area information may include indication information of the area A, the area B, the area C, and the area D.

In a subsequent MEC discovery process, if the CCF_B receives a MEC discovery request, the MEC discovery request includes target reference information, and the target reference information is used to request to obtain a MEC that can serve the area A, the CCF_B may determine, based on the attribute description information of the CCF_A, that the CCF_A corresponds to the target reference information, and then send a MEC discovery request to the CCF_A, to obtain information about a corresponding MEC from the CCF_A. Alternatively, the CCF_B may send the identifier of the CCF_A (or the identifier of the CCF_A+the identifier of the PLMN_A) to a requester, and the requester may request, from the CCF_A, to obtain information about a MEC that can provide a corresponding service.

Optionally, the foregoing step 1002 may be performed each time the registration information of the MEC is received, or the foregoing step 1002 may be periodically performed.

Step 1003: The sixth network element locally updates the received registration information, so that after subsequently receiving a MEC discovery request, the sixth network element selects, based on the locally stored registration information, a MEC corresponding to the target reference information or a CCF corresponding to the MEC.

Step 1004: The sixth network element sends a registration response to the fifth network element.

Figure 12:
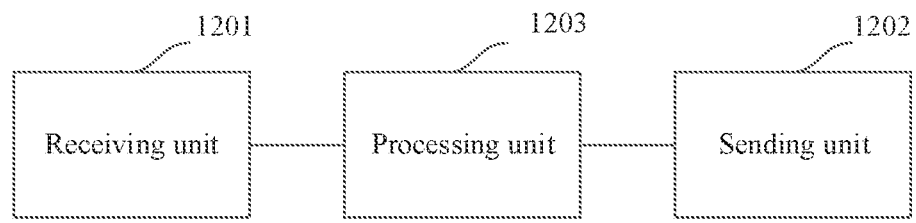
FIG. 12 is a first schematic structural diagram of a MEC information obtaining apparatus according to an embodiment of this application.

Based on a same technical concept, an embodiment of this application further provides a MEC information obtaining apparatus, configured to perform a function performed by the first network element in the foregoing MEC information obtaining methods. FIG. 12 is an example of a schematic structural diagram of the apparatus. As shown in the figure, the apparatus may include a receiving unit 1201 and a sending unit 1202. Further, the apparatus may further include a processing unit 1203.

The receiving unit 1201 is configured to receive target reference information from a second network element.

The sending unit 1202 is configured to send, to the second network element, information about a MEC corresponding to the target reference information.

In a possible implementation, the target reference information includes at least one of target location information and target capability information.

In a possible implementation, before the sending unit 1202 sends, to the second network element, the information about the MEC corresponding to the target reference information, the receiving unit 1201 is further configured to receive first registration information of the MEC, where the first registration information includes addressing information of the MEC and attribute description information of the MEC.

In a possible implementation, the attribute description information includes one or more of the following information: application programming interface API information provided by the MEC, location information of the MEC, service area information of the MEC, capability description information of the MEC, and a domain identifier of the MEC.

In a possible implementation, the first network element is a common API framework core function CCF, and the second network element is a mobile edge computing MEC; or the first network element is a CCF, the second network element is a CCF, and a domain to which the first network element belongs is different from a domain to which the second network element belongs; or the first network element is a MEC proxy function entity, and the second network element is a MEC; or the first network element is a MEC proxy function entity, the second network element is a MEC proxy function entity, and a domain to which the first network element belongs is different from a domain to which the second network element belongs; or the first network element is a network exposure function network element NEF, and the second network element is a MEC: or the first network element is a NEF, the second network element is a NEF, and a domain to which the first network element belongs is different from a domain to which the second network element belongs.

In a possible implementation, when a domain to which the MEC belongs is the same as a domain to which the first network element belongs, after the receiving unit 1201 receives the first registration information, the sending unit 1202 is further configured to send second registration information of the MEC to a third network element, where the second registration information is used to register the information about the MEC with the third network element, a domain to which the third network element belongs is different from the domain to which the first network element belongs, the second registration information includes the addressing information of the MEC and some or all of the attribute description information of the MEC.

In a possible implementation, the first network element further includes a processing unit, where the attribute description information of the MEC includes the location information of the MEC, and the processing unit is configured to: when the processing unit determines, based on the location information of the MEC, that the MEC is located in the domain to which the first network element belongs, convert the location information of the MEC into general location information, where location information sent by the sending unit 1202 to the third network element is the general location information; and/or the attribute description information of the MEC includes the service area information of the MEC, and the processing unit is configured to: when the processing unit determines, based on the service area information of the MEC, that a service area of the MEC is located in the domain to which the first network element belongs, convert the service area information of the MEC into general service area information, where service area information sent by the sending unit 1202 to the third network element is the general service area information.

In a possible implementation, the first network element is a CCF, the third network element is a CCF, and the domain to which the first network element belongs is different from the domain to which the third network element belongs.

In a possible implementation, the information about the MEC includes information about a CCF corresponding to the MEC.

In a possible implementation, the information about the MEC includes the addressing information of the MEC and the attribute description information of the MEC.

Figure 13:
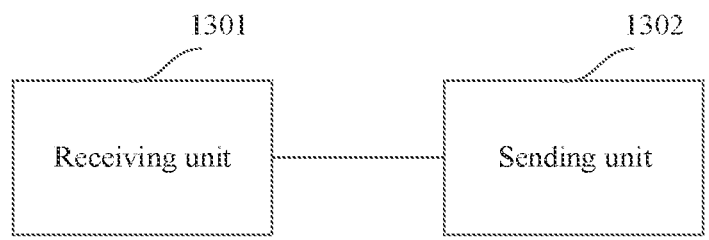
FIG. 13 is a second schematic structural diagram of a MEC information obtaining apparatus according to an embodiment of this application.

Based on a same technical concept, an embodiment of this application further provides a MEC information obtaining apparatus, configured to perform a function performed by the first network element in the foregoing MEC information obtaining methods. FIG. 13 is an example of a schematic structural diagram of the apparatus. As shown in the figure, the apparatus may include a receiving unit 1301 and a sending unit 1302.

The sending unit 1302 is configured to send target reference information to a first network element.

The receiving unit 1301 is configured to receive, from the first network element, information about a MEC corresponding to the target reference information.

In a possible implementation, the target reference information includes at least one of target location information and target capability information.

In a possible implementation, the information about the MEC includes information about a CCF corresponding to the MEC.

In a possible implementation, the information about the MEC includes addressing information of the MEC and attribute description information of the MEC.

In a possible implementation, the attribute description information of the MEC includes one or more of the following information: service area information of the MEC, capability description information of the MEC, application programming interface API information provided by the MEC, location information of the MEC, and a domain identifier of the MEC.

In a possible implementation, the first network element is a common API framework core function CCF, and the second network element is a mobile edge computing MEC; or the first network element is a CCF, the second network element is a CCF, and a domain to which the first network element belongs is different from a domain to which the second network element belongs; or the first network element is a MEC proxy function entity, and the second network element is a MEC; or the first network element is a MEC proxy function entity, the second network element is a MEC proxy function entity, and a domain to which the first network element belongs is different from a domain to which the second network element belongs; or the first network element is a network exposure function network element NEF, and the second network element is a MEC; or the first network element is a NEF, the second network element is a NEF, and a domain to which the first network element belongs is different from a domain to which the second network element belongs.

In a possible implementation, the attribute description information of the MEC includes API information provided by the MEC;

the sending unit 1302 is further configured to send, based on the API information, an API invocation request to the MEC corresponding to the target reference information; and the receiving unit 1301 is further configured to receive an API invocation response sent by the MEC corresponding to the target reference information.

In a possible implementation, the second network element is a MEC;

when the attribute description information of the MEC does not include API information provided by the MEC, the sending unit 1302 is further configured to: send an API discovery request to the MEC corresponding to the target reference information, or send an API discovery request to a CCF corresponding to the MEC corresponding to the target reference information; and the receiving unit 1301 is further configured to receive an API discovery response, where the API discovery response includes the API information provided by the MEC.

In a possible implementation, the sending unit 1302 is further configured to:

send registration information of the MEC to the first network element, where the registration information of the MEC includes the addressing information of the MEC and the attribute description information of the MEC.

Figure 14:
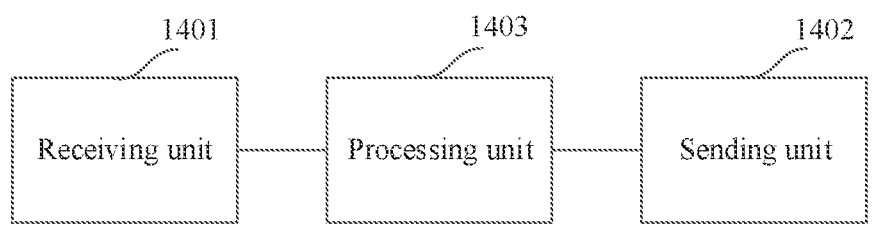
FIG. 14 is a third schematic structural diagram of a MEC information obtaining apparatus according to an embodiment of this application.

Based on a same technical concept, an embodiment of this application further provides a MEC information obtaining apparatus, configured to perform a function performed by the first network element in the foregoing MEC information obtaining methods. FIG. 14 is an example of a schematic structural diagram of the apparatus. As shown in the figure, the apparatus may include a receiving unit 1401 and a sending unit 1402. Further, the apparatus may further include a processing unit 1403.

The receiving unit 1401 is configured to receive first registration information from a MEC, where the first registration information includes addressing information of the MEC and attribute description information of the MEC; and The sending unit 1402 is configured to send second registration information to a second network element based on the first registration information, where a domain to which the first network element belongs is different from a domain to which the second network element belongs.

In a possible implementation, the attribute description information of the MEC includes one or more of the following information: service area information of the MEC, capability description information of the MEC, application programming interface API information provided by the MEC, location information of the MEC, and a domain identifier of the MEC.

In a possible implementation, the first network element further includes a processing unit 1403, where the attribute description information of the MEC includes the location information of the MEC, and the processing unit is configured to: when the processing unit determines, based on the location information of the MEC, that the MEC is located in the domain to which the first network element belongs, convert the location information of the MEC into general location information, where location information sent by the sending unit to the third network element is the general location information; and/or the attribute description information of the MEC includes the service area information of the MEC, and the processing unit is configured to: when the processing unit determines, based on the service area information of the MEC, that the MEC is located in the domain to which the first network element belongs, convert the service area information of the MEC into general service area information, where service area information sent by the sending unit to the third network element is the general service area information.

Figure 15:
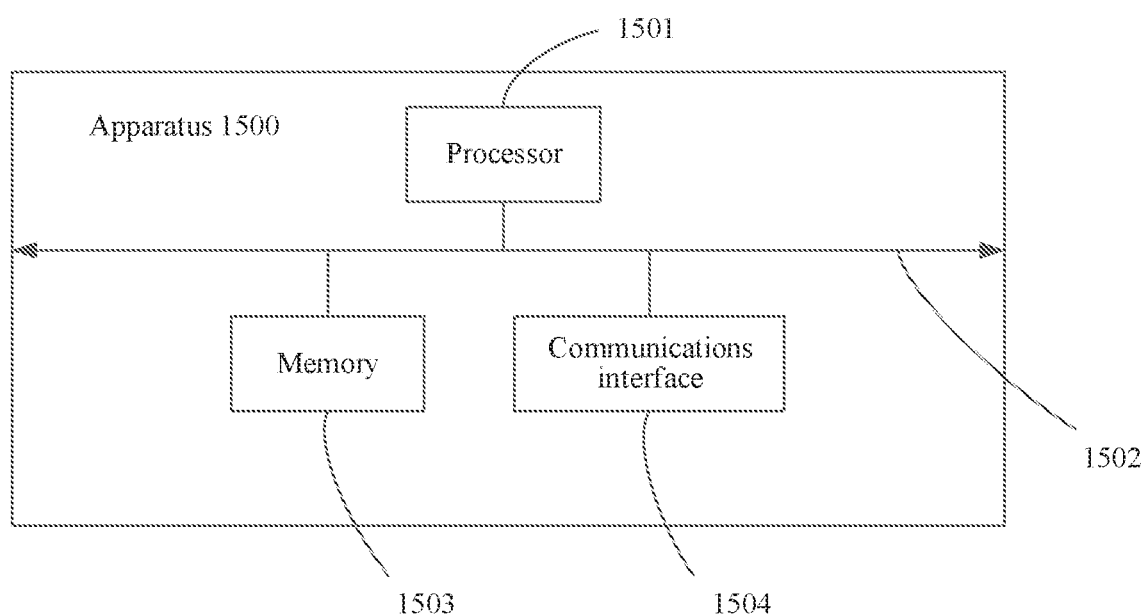
FIG. 15 is a fourth schematic structural diagram of a MEC information obtaining apparatus according to an embodiment of this application.

Based on a same technical concept, an embodiment of this application provides a MEC information obtaining apparatus 1500, configured to implement a function performed by the first network element in the foregoing method embodiments. Specifically, a hardware structure of the apparatus 1500 may be shown in FIG. 15, and includes at least one processor 1501, a communications bus 1502, a memory 1503, and at least one communications interface 1504.

The processor 1501 may be a general-purpose central processing unit (CPU), a microprocessor, an application-specific integrated circuit (ASIC), or one or more integrated circuits for controlling program execution of the solutions of this application.

The communications bus 1502 may include a path, to transmit information between the foregoing components.

The communications interface 1504, which uses any apparatus such as a transceiver, is configured to communicate with another device or a communications network, such as the Ethernet, a radio access network (RAN), or a wireless local area network (WLAN).

The memory 1503 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may be integrated with the processor.

The memory 1503 is configured to store application program code for executing a solution in this application, and the processor 1501 controls the execution of the application program code. The processor 1501 is configured to execute the application program code stored in the memory 1503, to implement the MEC information obtaining methods according to the foregoing embodiments of this application.

Alternatively, optionally, in this embodiment of this application, the processor 1501 may perform a related function in the MEC information obtaining methods provided in the foregoing embodiments of this application, and the communications interface 1504 is responsible for communication with another device or a communications network. This is not specifically limited in this embodiment of this application.

During specific implementation, in an embodiment, the processor 1501 may include one or more CPUs.

During specific implementation, in an embodiment, the apparatus may include a plurality of processors. Each of these processors may be a single-core (single-CPU) processor, or may be a multi-core (multi-CPU) processor. The processor herein may be one or more devices, circuits, and/or processing cores configured to process data (for example, a computer program instruction).

Figure 16:
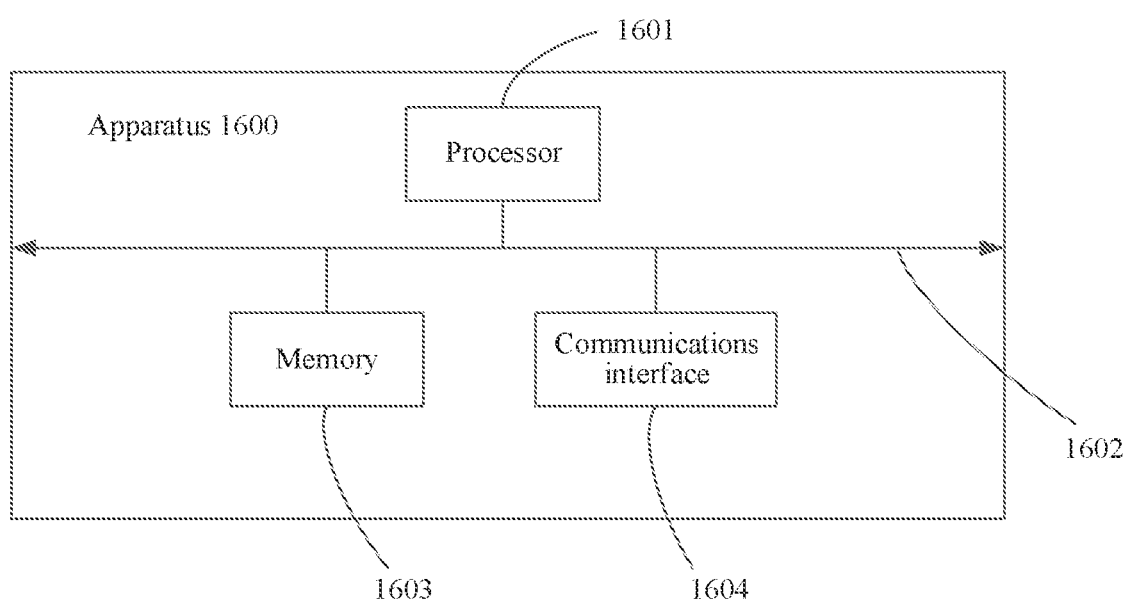
FIG. 16 is a fifth schematic structural diagram of a MEC information obtaining apparatus according to an embodiment of this application.

Based on a same technical concept, an embodiment of this application provides a MEC information obtaining apparatus 1600, configured to implement a function performed by the second network element in the foregoing method embodiments. Specifically, a hardware structure of the apparatus 1600 may be shown in FIG. 16, and includes at least one processor 1601, a communications bus 1602, a memory 1603, and at least one communications interface 1604.

The processor 1601 may be a general-purpose central processing unit (CPU), a microprocessor, an application-specific integrated circuit (ASIC), or one or more integrated circuits for controlling program execution of the solutions of this application.

The communications bus 1602 may include a path, to transmit information between the foregoing components.

The communications interface 1604, which uses any apparatus such as a transceiver, is configured to communicate with another device or a communications network, such as the Ethernet, a radio access network (RAN), or a wireless local area network (WLAN).

The memory 1603 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor by using the bus. The memory may be integrated with the processor.

The memory 1603 is configured to store application program code for executing a solution in this application, and the processor 1601 controls the execution of the application program code. The processor 1601 is configured to execute the application program code stored in the memory 1603, to implement the MEC information obtaining methods according to the foregoing embodiments of this application.

Alternatively, optionally, in this embodiment of this application, the processor 1601 may perform a related function in the MEC information obtaining methods provided in the foregoing embodiments of this application, and the communications interface 1604 is responsible for communication with another device or a communications network. This is not specifically limited in this embodiment of this application.

During specific implementation, in an embodiment, the processor 1601 may include one or more CPUs.

During specific implementation, in an embodiment, the apparatus may include a plurality of processors. Each of these processors may be a single-core (single-CPU) processor, or may be a multi-core (multi-CPU) processor. The processor herein may be one or more devices, circuits, and/or processing cores configured to process data (for example, a computer program instruction).

An embodiment of this application further provides a storage medium. The storage medium stores a computer program, and the computer program is executed by a processor, to implement the methods according to the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, a person skilled in the art can make various modifications and variations to this application without departing from the spirit and scope of this application. This application is intended to cover these modifications and variations of this application provided that they fall within the scope defined by the following claims and their equivalent technologies.

What is claimed is:

1. A mobile edge computing (MEC) information obtaining method, comprising:
   sending, by a second network element, target reference information to a first network element, wherein the target reference information comprises target capability information;
   receiving, by the first network element, the target reference information;
   determining, by the first network element, a MEC platform corresponding to the target reference information, wherein the MEC platform has a target capability corresponding to the target capability information;
   sending, by the first network element to the second network element, information about the MEC platform corresponding to the target reference information; and
   receiving, by the second network element, the information about the MEC platform corresponding to the target reference information.

2. The method according to claim 1, wherein before sending, by the first network element to the second network element, the information about the MEC platform corresponding to the target reference information, the method further comprises:
   receiving, by the first network element, first registration information of the MEC platform, wherein the first registration information comprises addressing information of the MEC platform and attribute description information of the MEC platform.

3. The method according to claim 2, wherein the first registration information is carried in an application programming interface (API) publish request.

4. The method according to claim 2, wherein the attribute description information comprises one or more of application programming interface (API) information provided by the MEC platform, location information of the MEC platform, service area information of the MEC platform, capability description information of the MEC platform, and a domain identifier of the MEC platform.

5. The method according to claim 1, wherein the first network element is a common API framework core function (CCF), wherein the second network element is a CCF, and wherein a domain to which the first network element belongs is different from a domain to which the second network element belongs.

6. The method according to claim 1, wherein the information about the MEC platform comprises information about a framework core function (CCF) corresponding to the MEC platform.

7. The method according to claim 1, wherein the information about the MEC platform comprises addressing information of the MEC platform and attribute description information of the MEC platform.

8. A mobile edge computing (MEC) information obtaining system, comprising a first network element and a second network element, wherein:
   the second network element is configured to send target reference information to the first network element, wherein the target reference information comprises target capability information;
   the first network element is configured to receive the target reference information, determine a MEC platform corresponding to the target reference information, wherein the MEC platform has a target capability corresponding to the target capability information, and send, to the second network element, information about the MEC platform corresponding to the target reference information; and
   the second network element is configured to receive the information about the MEC platform corresponding to the target reference information.

9. The system according to claim 8, wherein:
   the second network element is further configured to send first registration information of the MEC platform to the first network element; and
   the first network element is further configured to receive the first registration information of the MEC platform, wherein the first registration information comprises addressing information of the MEC platform and attribute description information of the MEC platform.

10. The system according to claim 9, wherein the first registration information is carried in an application programming interface (API) publish request.

11. The system according to claim 9, wherein the attribute description information comprises one or more of application programming interface (API) information provided by the MEC platform, location information of the MEC platform, service area information of the MEC platform, capability description information of the MEC platform, and a domain identifier of the MEC platform.

12. The system according to claim 8, wherein the first network element is a common API framework core function (CCF), wherein the second network element is a CCF, and wherein a domain to which the first network element belongs is different from a domain to which the second network element belongs.

13. The system according to claim 8, wherein the information about the MEC platform comprises information about a framework core function (CCF) corresponding to the MEC platform.

14. The system according to claim 8, wherein the information about the MEC platform comprises addressing information of the MEC platform and attribute description information of the MEC platform.

15. A mobile edge computing (MEC) information obtaining apparatus, wherein the apparatus comprising:
a memory storing program code; and
at least one processor in communication with the memory, the at least one processor executing the program code to perform operations comprising:
receiving target reference information from a network element, wherein the target reference information comprises target capability information;
determining a MEC platform corresponding to the target reference information, wherein the MEC platform has a target capability corresponding to the target capability information; and
sending, to the network element, information about the MEC platform corresponding to the target reference information.

16. The apparatus according to claim 15, wherein before sending, to the network element, the information about the MEC platform corresponding to the target reference information, the operations further comprise:
receiving first registration information of the MEC platform, wherein the first registration information comprises addressing information of the MEC platform and attribute description information of the MEC platform.

17. The apparatus according to claim 16, wherein the first registration information is carried in an application programming interface (API) publish request.

18. The apparatus according to claim 16, wherein the attribute description information comprises one or more of application programming interface (API) information provided by the MEC platform, location information of the MEC platform, service area information of the MEC platform, capability description information of the MEC platform, and a domain identifier of the MEC platform.

19. The apparatus according to claim 15, wherein the apparatus is a common API framework core function (CCF), wherein the network element is a CCF, and wherein a domain to which the apparatus belongs is different from a domain to which the network element belongs.

20. The apparatus according to claim 15, wherein the information about the MEC platform comprises information about a framework core function (CCF) corresponding to the MEC platform.

* * * * *